United States Patent [19]
Chau et al.

[11] Patent Number: 6,147,987
[45] Date of Patent: *Nov. 14, 2000

[54] SUPPORTING LOAD SHARING ACROSS MULTIPLE NETWORK ACCESS SERVERS

[75] Inventors: Wing Cheong Chau, Los Altos Hills; Darren Leu, San Jose; Tze-jian Liu; Chandy Nilakantan, both of Cupertino; Jeffrey Kaiping Pao, San Jose; Tsyr-Shya Joe Sun, Milpitas; Wayming Daniel Tai, Cupertino; Xiaohu Wang, Milpitas, all of Calif.

[73] Assignee: 3Com Corporation, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/835,758

[22] Filed: Apr. 8, 1997

[51] Int. Cl.$^7$ ..................................................... H04L 12/66
[52] U.S. Cl. .......................................... 370/352; 370/468
[58] Field of Search .................................... 370/351, 352, 370/353, 354, 355, 356, 468

[56] References Cited

U.S. PATENT DOCUMENTS

| | | | |
|---|---|---|---|
| 4,672,572 | 6/1987 | Alsberg | 364/900 |
| 4,823,122 | 4/1989 | Mann et al. | 340/825.28 |
| 5,058,108 | 10/1991 | Mann et al. | 370/85.1 |
| 5,113,499 | 5/1992 | Ankney et al. | 395/325 |
| 5,287,461 | 2/1994 | Moore | 395/275 |
| 5,388,213 | 2/1995 | Oppenheimer et al. | 395/200 |
| 5,428,608 | 6/1995 | Freeman et al. | 370/352 |
| 5,475,819 | 12/1995 | Miller et al. | 395/200.03 |
| 5,495,533 | 2/1996 | Lineham et al. | 380/21 |
| 5,530,806 | 6/1996 | Condon et al. | 395/185.02 |
| 5,560,008 | 9/1996 | Johnson et al. | 395/6.5 |
| 5,598,536 | 1/1997 | Slaughter, III et al. | 395/200.16 |
| 5,621,734 | 4/1997 | Mann et al. | 370/94.1 |
| 5,625,677 | 4/1997 | Feiertag et al. | 379/93 |
| 5,628,005 | 5/1997 | Hurvig | 395/608 |
| 5,631,897 | 5/1997 | Pacheco et al. | 370/237 |
| 5,649,099 | 7/1997 | Theimer et al. | 395/187.01 |
| 5,652,859 | 7/1997 | Mulla et al. | 395/473 |
| 5,659,709 | 8/1997 | Quach | 395/473 |
| 5,708,780 | 1/1998 | Levergood et al. | 395/200.12 |
| 5,712,903 | 1/1998 | Bartholomew et al. | 379/89 |
| 5,724,574 | 3/1998 | Stratigos et al. | 395/610 |
| 5,734,810 | 5/1998 | Tanaka et al. | 395/182.02 |
| 5,740,371 | 4/1998 | Wallis | 395/200.59 |
| 5,757,916 | 5/1998 | MacDoran et al. | 380/25 |
| 5,761,281 | 6/1998 | Baum et al. | 379/93.29 |
| 5,790,554 | 8/1998 | Pitcher et al. | 370/471 |

(List continued on next page.)

*Primary Examiner*—Ajit Patel
*Attorney, Agent, or Firm*—David J. Weitz; Wilson Sonsini Goodrich & Rosati

[57] ABSTRACT

The present invention provides a modular architecture for connecting a plurality of telephone lines to a computer network. The invention binds a plurality of network access servers together so that they form a single system image to clients dialing into the plurality of network access servers. The invention operates by providing a tunneling mechanism for communication between the network access servers. The tunneling mechanism facilitates packet re-forwarding so that a call dialed into a physical port in a network access server can be re-forwarded through a logical port in another network access server. This allows a call to be routed through a physical port in a network access server even if no logical port is available in the network access server. Packet re-forwarding also allows multilink connections through physical ports in multiple network access servers to be routed through a single logical port in a network access server. Packet re-forwarding also provides support for spoofing; if the telephone line is torn down during spoofing, the logical port is maintained so that the connection may be reestablished through a physical port in another network access server. Finally, the present invention supports authentication across multiple network access servers using a security server, by allowing the network access servers to share authentication information.

14 Claims, 19 Drawing Sheets

U.S. PATENT DOCUMENTS

| | | | |
|---|---|---|---|
| 5,802,306 | 9/1998 | Hunt | 395/200.58 |
| 5,841,842 | 11/1998 | Baum et al. | 379/93.32 |
| 5,844,969 | 12/1998 | Goldman et al. | 379/93.24 |
| 5,870,386 | 2/1999 | Perlman | 370/256 |
| 5,889,958 | 3/1999 | Willens | 395/200.59 |
| 5,918,019 | 6/1999 | Valencia | 395/200.57 |
| 6,005,850 | 12/1999 | Moura et al. | 370/282 |
| 6,011,910 | 1/2000 | Chau et al. | 395/200.59 |
| 6,012,088 | 1/2000 | Li et al. | 709/219 |
| 6,026,085 | 2/2000 | Chau et al. | 370/352 |

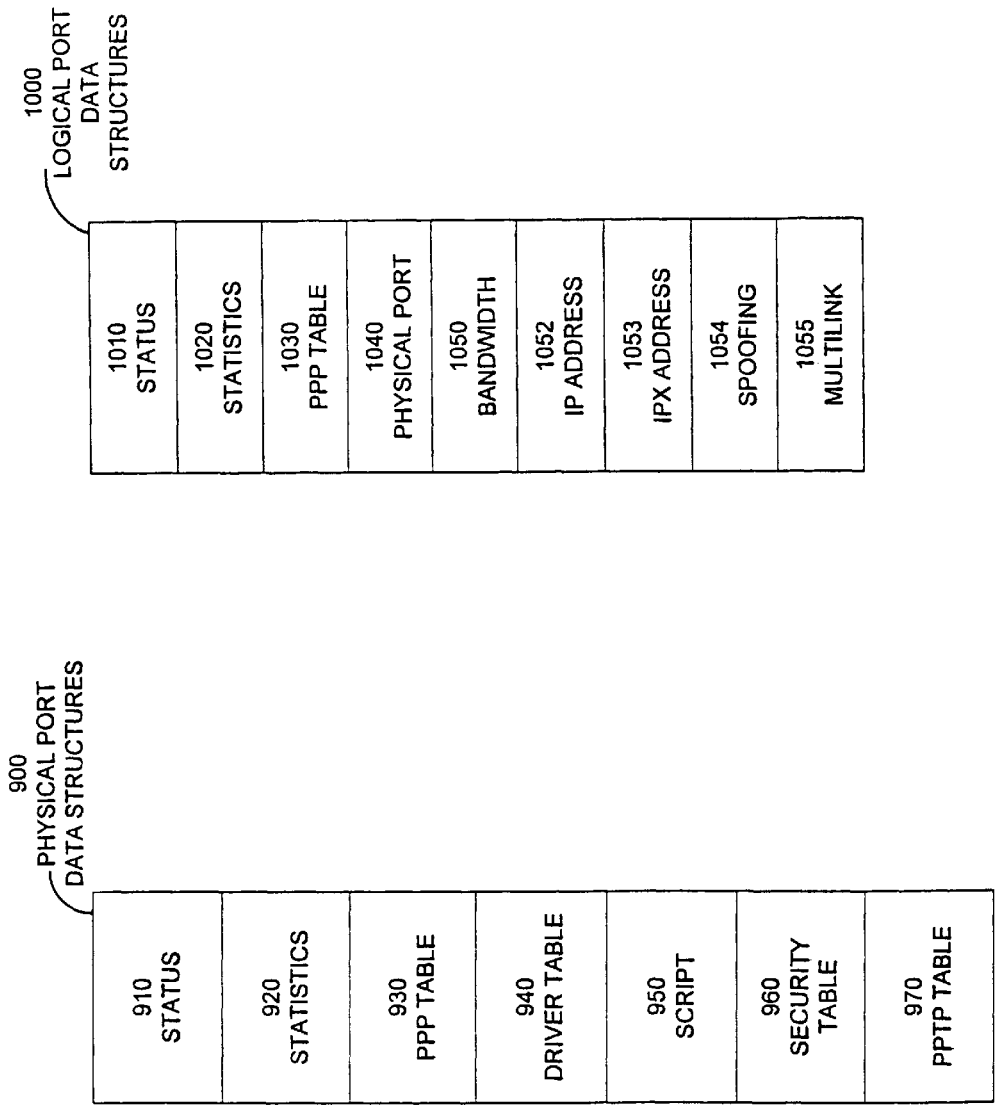

16,147,987

SUPPORTING LOAD SHARING ACROSS MULTIPLE NETWORK ACCESS SERVERS

RELATED APPLICATIONS

This application hereby incorporates by reference the following related non-provisional applications by the same inventors as the instant application, and filed on the same day as the instant application: "Integrated Architecture To Support a Single System Image Across Multiple Network Access Servers," having Ser. No. 08/835,532, and filing date Apr. 8, 1997; "Architecture To Support a Single System Image Across Multiple Network Access Servers," having Ser. No. 08/835,536, and filing date Apr. 8, 1997; "Supporting Multilink Connections Across Multiple Network Access Servers," having Ser. No. 08/835,534, and filing date Apr, 8, 1997; and "Supporting Authentication Across Multiple Network Access Servers," having Ser. No. 08/833,663, and filing date Apr. 8, 1997.

BACKGROUND

1. Field of the Invention

The present invention relates to systems for connecting telephone lines to computer networks, and more particularly to an architecture for providing a single system image across multiple network access servers, which connect telephone subscriber lines to a computer network.

2. Related Art

With the advent of computer networking and personal computers, telephone lines are increasingly being used to connect computer systems to computer networks such as the Internet. This has led to the development of network access servers for connecting telephone lines to computer networks. These networks access servers come in a number of forms.

Some network access servers include separate line servers and packet processors. Line servers connect to telephone lines and handle data communications across the telephone lines, for example handling modem scripts. Packet processors connect to a packet-switched network, such as the Internet, and coordinate communications across the packet-switched network.

A packet processor makes decisions about whether a call can be accepted from a telephone line and how to forward the constituent data packets to the packet-switched network. Line servers and packet processors communicate with each other through a communication channel. Sometimes they use a tunneling protocol, such as the point to point tunneling protocol (PPTP) to communicate through the communication channel.

Other network access servers include a line server and a packet processor integrated together into a single module or box. The line server connects to telephone lines, and the packet processor connects to a packet-switched network. The line server and packet processor connect to each other through internal connections within the integrated module.

As telephone lines are being increasingly used to connect computers to computer networks, there is an increasing need for network access servers with larger numbers of ports to service larger numbers of telephone lines.

What is needed is a network access server architecture which can flexibly accommodate larger numbers of telephone lines.

SUMMARY

The present invention provides a modular architecture for connecting a plurality of network access servers together in a way that preserves a single system image across the plurality of network access servers. This modular architecture supports a variety of different types of connections. It supports multilink connections, in which a single connection uses multiple telephone lines for increased bandwidth. It supports spoofing, wherein an idle connection temporarily relinquishes its telephone line. It supports load sharing, wherein connections are distributed between network access servers. Finally, the modular architecture provides resources for performing authentication of a system user, including authentication using a security server.

Thus, the present invention can be characterized as an apparatus for routing communications between a plurality of telephone lines and a remote host on a packet-switched network, comprising a plurality of modules which include: a plurality of telephone ports coupled to respective telephone lines; a network interface coupled to the packet-switched network; and resources coupled to the network interface and the plurality of telephone ports for facilitating communications between telephone lines coupled to other modules and the remote host through the network interface.

According to one aspect of the present invention, modules communicate with each other using a tunneling protocol. In one variation of this embodiment, the tunneling protocol includes the PPTP protocol. In another variation, the tunneling protocol includes enhancements to the PPTP protocol.

The present invention can also be characterized as an apparatus for routing communications between a plurality of telephone lines and a remote host coupled to a data network, wherein the apparatus includes a communication channel and a plurality of modules, wherein modules include: a communication channel interface coupled to the communication channel; a plurality of telephone ports coupled to respective telephone lines; a network interface coupled to the data network; and resources coupled to the network interface and the plurality of telephone ports for facilitating communications between telephone lines coupled to other modules and the remote host through the network interface.

According to one aspect of this embodiment, resources included in the modules communicate with other modules using a tunneling protocol. In one variation of this embodiment, the tunneling protocol includes the PPTP protocol. In another variation, the tunneling protocol includes enhancements to the PPTP protocol.

According to another aspect of this embodiment, the resources for facilitating communications in the modules include: a plurality of physical ports for facilitating communications with associated telephone lines, and a plurality of logical ports for facilitating communication with logical connections to the remote host over the data network. In some instances, communications between a telephone line and the remote host flow through a physical port in a first module and a logical port in a second module.

The present invention can additionally be characterized as an apparatus for routing communications between a plurality of telephone lines and a remote host on a data network, including: a plurality of telephone ports coupled to the plurality of telephone lines; a first network interface coupled to the data network; and resources coupled to the network interface and the plurality of telephone ports for receiving through the network interface communications from telephone lines coupled to the data network and forwarding the communications from the first network interface to the remote host through a second network interface coupled to the data network.

The present invention can also be characterized as an apparatus for routing communications between a plurality of telephone lines and a remote host on a data network, comprising: a plurality of telephone ports coupled to the plurality of telephone lines; a communication channel interface coupled to a communication channel; a network interface coupled to the data network; and resources coupled to the communication channel interface, the network interface and the plurality of telephone ports for receiving communications from telephone lines coupled to the communication channel through the communication channel interface, and forwarding the communications to the remote host through the network interface.

The present invention can also be characterized as an apparatus for routing communications between a plurality of telephone lines and a remote host coupled to a data network comprising: a communication channel coupled to the remote host; a plurality of line servers coupled to the communication channel and the plurality of telephone lines; and a plurality of modules coupled to the communication channel including resources for facilitating communications between line servers and the remote host, the resources communicating with other modules to facilitate communications between the plurality of telephone lines coupled to the plurality of line servers and the remote host coupled to the data network.

The present invention can also be characterized as an apparatus for routing communications between a plurality of telephone lines and a remote host, comprising: a communication channel coupled to the remote host; a plurality of line servers coupled to the communication channel and the plurality of telephone lines; and a plurality of modules coupled to the communication channel, including resources for facilitating communications between the plurality of line servers and the remote host, wherein modules include a plurality of physical ports for facilitating communications with associated telephone lines, and a plurality of logical ports for facilitating communications with logical connections to the remote host, allowing a communication between the plurality of telephone lines and the remote host to flow through a physical port in a first module and a logical port in a second module using a tunneling protocol.

One aspect of the present invention can be characterized as a method which operates in a system for coupling a plurality of telephone lines to a packet-switched network, including a plurality of modules coupled to the packet-switched network, modules including resources for facilitating communications between the plurality of telephone lines and the packet-switched network. The method distributes communications from telephone lines across modules by: receiving at a module a call from a telephone line; determining if resources are available for the call at the module; and if no resources are available for the call, routing the call through another module.

Another aspect of the present invention can be characterized as a method which operates in a system for coupling a plurality of telephone lines to a packet-switched network, including a plurality of modules coupled to a communication channel, modules including a plurality of physical ports for facilitating communications with a plurality of telephone lines, and a plurality of logical ports for facilitating connections to the packet-switch network. The method distributes communications from the plurality of telephone lines across modules by: receiving at a physical port within a module, a call from a telephone line; determining that no logical ports are available for the call at the module; and routing the call through a logical port in another module.

Another aspect of the present invention can be characterized as a method which operates in a system for coupling a plurality of telephone lines to a packet-switched network, including a plurality of modules connected to a communication channel, modules including resources for facilitating communications between the plurality of telephone lines and the packet-switched network. The method facilitates bandwidth-on-demand across a multilink connection by: monitoring traffic on the multilink connection; and in response to a low traffic condition on the multilink connection, tearing down a link in the multilink connection.

One aspect of the present invention can be characterized as a method which operates in a system for coupling in a plurality of telephone lines to a packet-switched network, including a plurality of modules connected to a communication channel, modules including a plurality of physical ports for facilitating communications with the plurality of telephone lines, and a plurality of logical ports for facilitating connections to the packet-switched network. The method facilitates a multilink connection by: monitoring traffic on a multilink connection, the multilink connection including a plurality of links between a logical port in a module and a plurality of physical ports in a plurality of modules; and in response to a low traffic condition on the multilink connection, tearing down a link.

One aspect of this method includes prior to the monitoring step, receiving at a module a request for a multilink connection and establishing the multilink connection including a plurality of links between a logical port in a module and a plurality of physical ports in a plurality of modules.

According to another aspect of this method, the step of establishing a multilink connection first establishes links between physical ports in the module and a logical port in the same module, and if no additional physical ports are available in the module, next establishes links between physical ports in other modules and the logical port in the module.

One aspect of the present invention operates in a system for coupling a plurality of telephone lines to a packet-switched network, including a plurality of modules connected to a communication channel, modules including resources for facilitating communications between the plurality of telephone lines and the packet-switch network. The method facilitates a multilink connection by: receiving at a module a request for a multilink connection; and establishing the multilink connection, including a plurality of the links through modules in the plurality of modules.

One aspect of the present invention operates in a system for coupling a plurality of telephone lines to a packet-switched network, including a plurality of modules connected to a communication channel, modules including resources for facilitating communications between the plurality of telephone lines and the packet-switched network. The method authenticates a user access by: receiving a request at a module to establish a connection from a user between telephone lines and the packet-switched network through the module; searching for the user in authentication data in the resources within the module; seeking authentication for the user from a security server; and searching for the user in authentication data in resources within other modules.

The present invention has a number of advantages. It provides scalability, which allows a system of network access servers to accommodate additional network access servers while preserving a single system image. This allows a hunt group of telephone numbers to be distributed across several network access servers. The present invention provides facilities to support load sharing and multilink connections across a plurality of modules. The present invention also provides a bandwidth-on-demand feature, which adds telephone lines and tears down telephone lines as necessary to support the bandwidth requirements of a particular connection to the packet-switched network. The present invention also provides facilities to perform authentication across multiple network access servers using a security server.

DESCRIPTION OF THE FIGURES

FIG. 2 also illustrates communications between the packet processor modules.

FIG. 9 is a table illustrating some of the major data structures associated with a physical port in accordance with an aspect of the present invention.

FIG. 10 is a table illustrating some of the major data structures associated with a logical port in accordance with an aspect of the present invention.

DESCRIPTION

The following description is presented to enable a person skilled in the art to make and use the invention, and is provided in the context of a particular application and its requirements. Various modifications to the preferred embodiment will be readily apparent to those skilled in the art and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
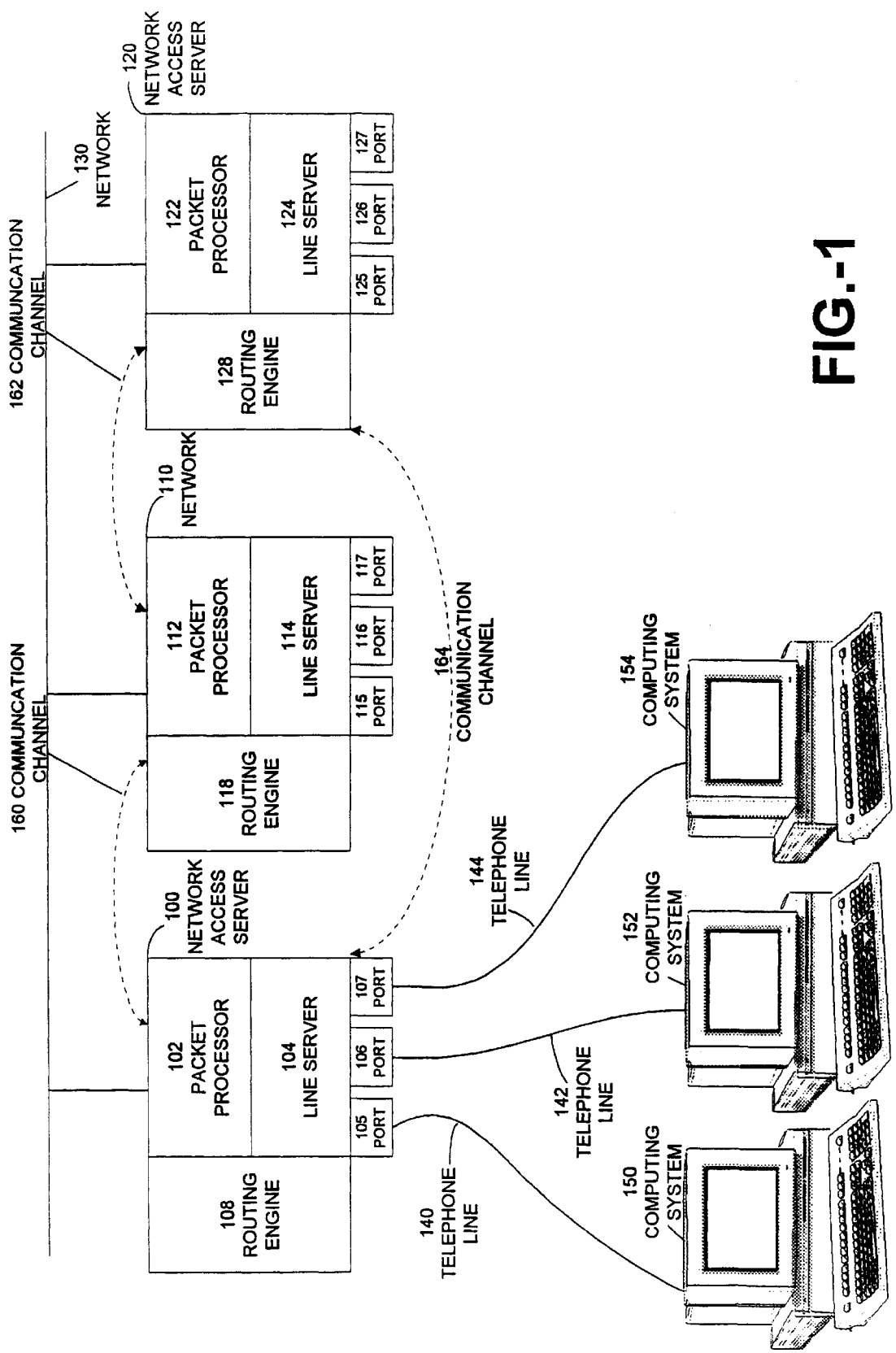
FIG. 1 is a block diagram illustrating the internal structure of, and communications between, a plurality of network access servers in accordance with the aspect of the present invention.

FIG. 1 is a block diagram illustrating one embodiment of a system for connecting telephone lines to a packet-switched network in accordance with an aspect of the present invention. Network access servers 100, 110 and 120 connect to network 130. Network access server 100 includes packet processor 102, line server 104, routing engine 108, and ports 105, 106 and 107. Packet processor 102 connects to network 130 and relays data between line server 104 and network 130 under control of routing engine 108. Line server 104 connects to ports 105, 106 and 107, through which line server 104 connects to telephone lines 140, 142 and 144, respectively. Telephone lines 140, 142 and 144 connect to respective computer systems 150, 152 and 154.

Network access server 100 facilitates communication between computing systems 150, 152 and 154 and network 130. Communications from computing systems 150, 152 and 154 pass through ports 105, 106 and 107 into line server 104. Line server 104 routes these communications through packet processor 102 onto network 130 under control of routing engine 108.

Network access server 110 is structured similarly. It includes packet processor 112, line server 114, routing engine 118 and ports 115, 116 and 117. Ports 115, 116 and 117 connect to associated telephone lines which further connect to computing systems which are not shown. Network access server 120 similarly includes packet processor 122, line server 124, routing engine 128 and ports 125, 126 and 127.

Network access servers 100, 110 and 120 communicate with each other through network 130. Network access server 100 communicates with network access server 110 through communication channel 160, which passes through network 130. Network access server 110 communicates with network access server 130 through communication channel 162, which passes through network 130. Finally, network access server 100 communicates with network access server 120 through communication channel 164, which also passes through network 130. In another embodiment, communication channels 160, 162 and 164 do not pass through network 130, but rather pass through a separate communication network.

Network 130 is any type of packet-switched network, including local area networks as well as wide area networks such as the Internet.

The system illustrated in FIG. 1 operates as follows. A computing system, such as computing system 150, communicates through telephone line 140 and port 105 to line server 104, which handles modem communications across telephone line 140 to computing system 150. Line server 104 communicates with packet processor 102 under control of routing engine 106. Packet processor 102 handles the routing of data from computing system 150 onto network 130. This involves routing information amongst network access servers 100, 110 and 120 as well as across network 130.

Figure 2:
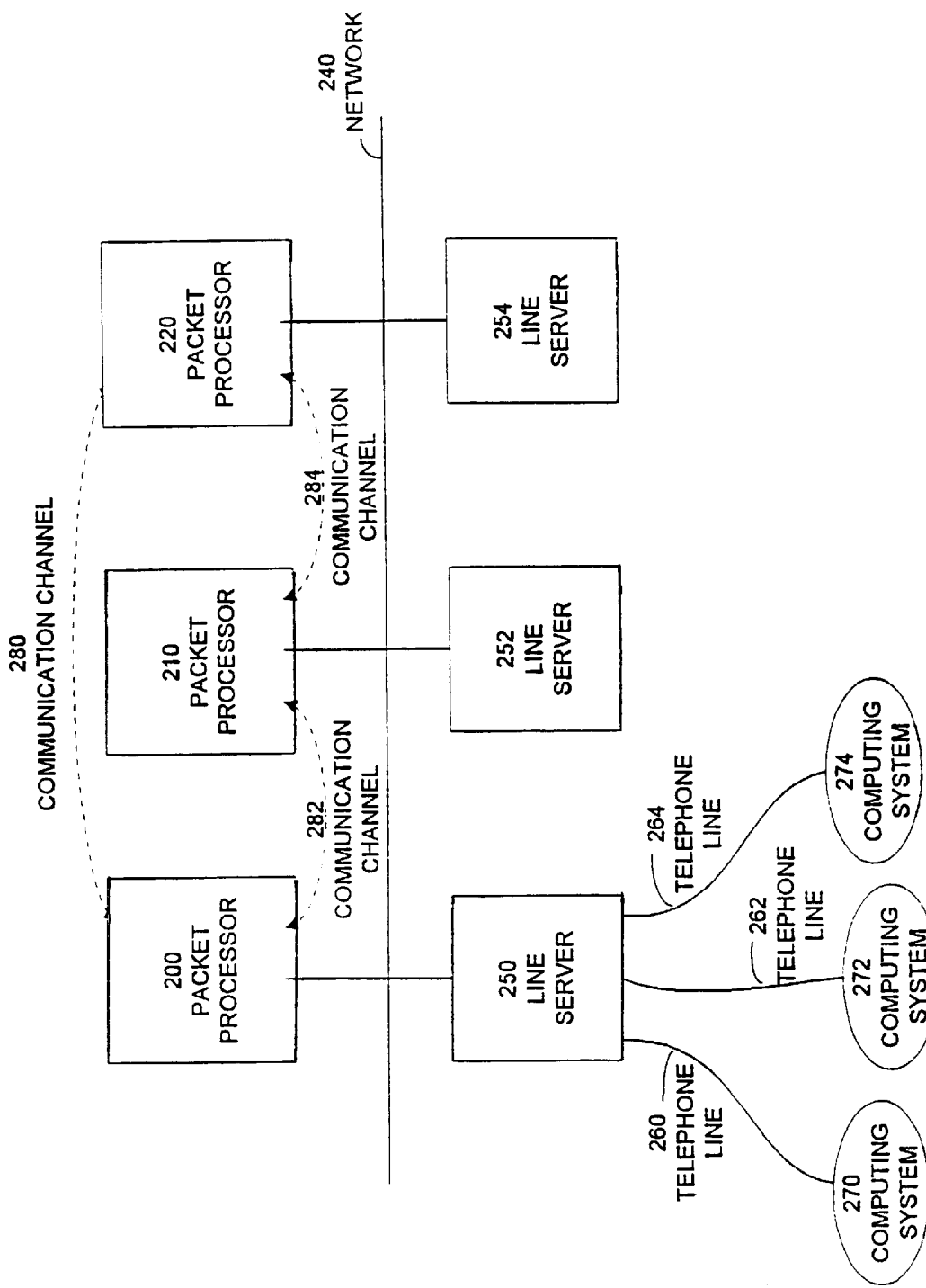
FIG. 2 is a block diagram illustrating an embodiment of the present invention comprising separate packet processor modules and separate line server modules in accordance with an aspect of the present invention.

FIG. 2 illustrates another embodiment of the present invention in which the packet processors are separate from the line servers. In this embodiment, packet processors 200, 210 and 220 connect to network 240. Separate line servers 250, 252 and 254 also connect to network 240. Line server 250 connects through telephone lines 260, 262 and 264 to computing systems 270, 272 and 274, respectively.

Communications between packet processors 200, 210 and 220 pass through network 240. Packet processor 200 communicates with packet processor 210 through communication channel 282, which passes through network 240. Packet processor 210 communicates with packet processor 220 through communication channel 284, which passes through network 240. Packet processor 200 communicates with packet processor 220 through communication channel 280, which passes through network 240. In another embodiment, communication channels 280, 282 and 284 do not pass through network 240, but rather pass through a separate communication network.

The system illustrated in FIG. 2 operates as follows. A computing system, such as computing system 270, communicates with line server 250 through telephone line 260. Line server 250 handles communications with computing system 270 across telephone line 260, which includes handling modem scripts. Line server 250 communicates with one of packet processors 200, 210 or 220 using a tunneling protocol. The associated packet processor handles communications across network 240 to a remote host.

Figure 3:
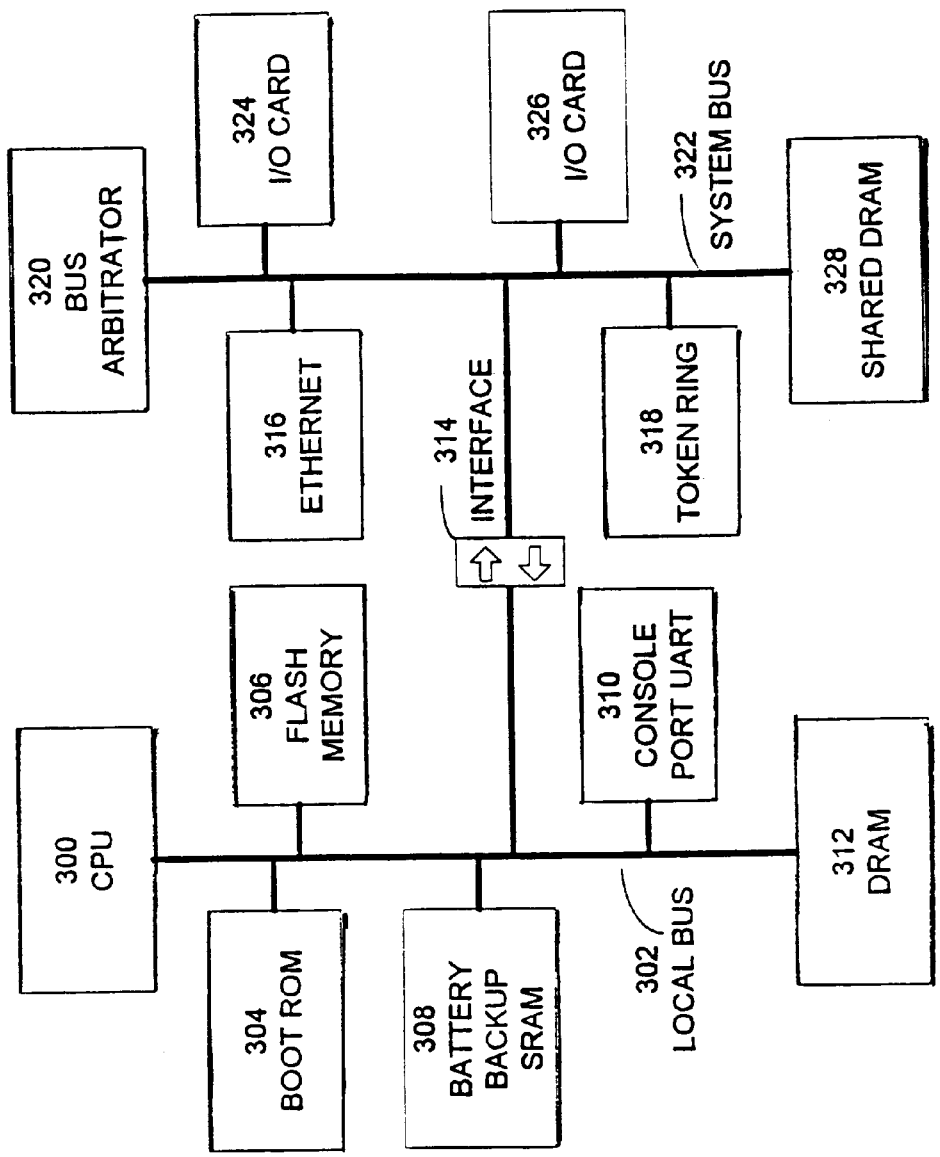
FIG. 3 is a block diagram of the internal structure of a packet processor, illustrating some of the major functional components and interfaces, in accordance with an aspect of the present invention.

FIG. 3 illustrates the structure one embodiment of a packet processor in accordance with an aspect of the present invention. Local bus 302 connects to CPU 300, boot ROM 304, flash memory 306, battery backup SRAM 308, console port UART 310 and DRAM 312. Local bus 302 connects through interface 314 to system bus 322. System bus 322 connects to Ethernet interface 316, token ring interface 318, IO card 324, IO card 326 and shared DRAM 328. Bus arbitrator 320 controls operations on system bus 322.

The components connected to local bus 302 primarily store data. DRAM 312 stores instructions for execution by CPU 300. Boot ROM 304 contains initialization instructions for CPU 300. Flash memory 306 provides storage for system software for CPU 300. Upon system boot up, this system software is copied to DRAM 312, which allows for faster execution than directly executing from flash memory 306. Battery backup SRAM 308 provides non-volatile storage for configuration data by CPU 300. Console port UART 310 provides an interface to an external console.

On system bus 322, the peripherals include: Ethernet interface 316, token ring interface 318, I/O card 324, and I/O card 326. These peripherals are intelligent peripherals which can function as a bus master, a bus slave, or both. As a bus slave, a peripheral responds to read and write commands from CPU 300. This mode is typically employed by CPU 300 to configure the peripheral devices. The intelligent peripherals can also function as a bus master. In this mode, they share the system bus under control of bus arbitrator 320. The intelligent peripherals connected to system bus 322 communicate with CPU 300 through shared DRAM 328; they do not communicate with each other directly.

Figure 4:
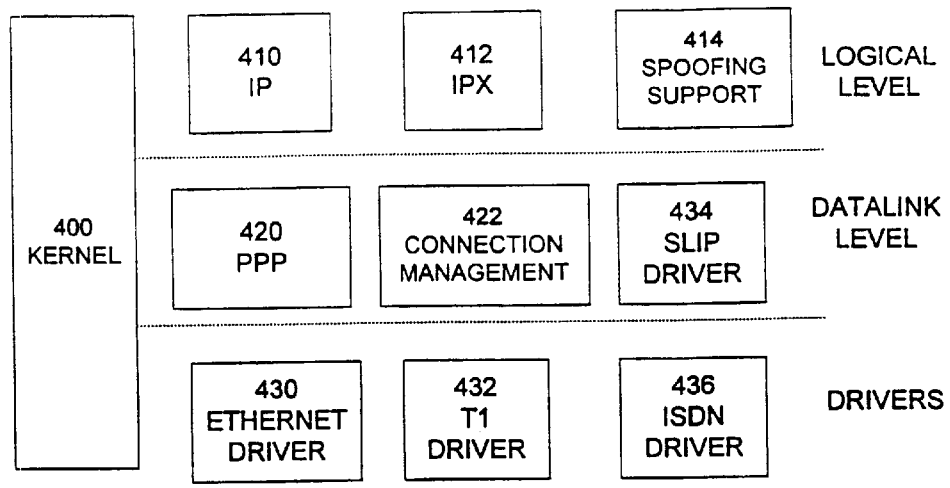
FIG. 4 is a block diagram illustrating some of the major functional components of the software architecture of a network access server in accordance with an aspect of the present invention.

FIG. 4 is a block diagram illustrating some of the major functional components of the software architecture within a network access server or a packet processor in accordance with an aspect of the present invention. Level three components include: IP component 410, IPX component 412 and spoofing support component 414. Level two components include: PPP component 420, SLIP driver 434 and connection management component 422. Finally, level one components include: Ethernet driver 430, T1 driver 432 and ISDN driver 436. Kernel 400 spans all three levels and contains the core software for supporting functions of the network access server.

Figure 5:
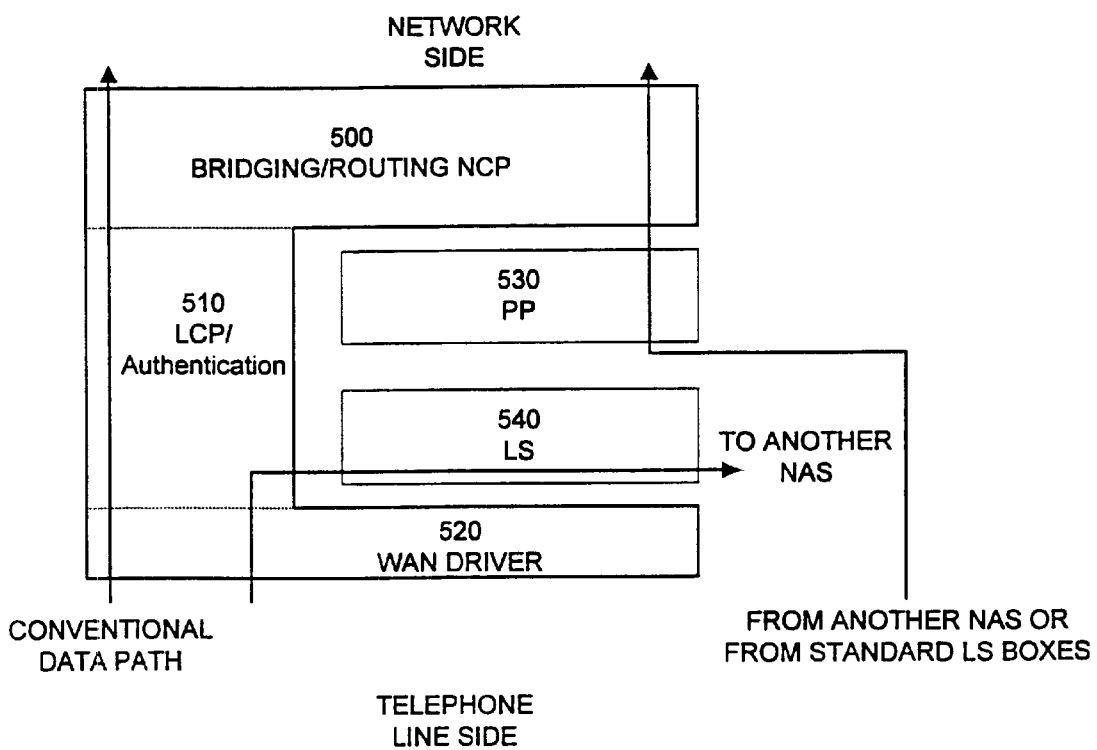
FIG. 5 is a diagram illustrating how data is routed through a network access server as appears in FIG. 1 in accordance with an aspect of the present invention.

FIG. 5 illustrates a number of possible data paths through the network access servers illustrated in FIG. 1. Recall that the network access servers in FIG. 1 include an integrated packet processor and line server. A conventional data path flows through a line server and an associated packet processor within the same network access server. The conventional data path starts at a port, flows through WAN driver 520, then through LCP (link layer control protocol)/authentication module 510, and then through bridging/routing NCP (network control protocol) module 500.

Communications may also flow between a line server in one network access server and a packet process server in another network access server. For example, in FIG. 1, suppose computing system 150 communicates through telephone line 140 and port 105 with line server 104 within network access server 100. Line server 104 could forward the communication through packet processor 112 within network access server 110, which would forward the communication to network 130. This type of connection is illustrated by the pathway immediately to the right of the conventional data path. This pathway passes through WAN driver 520, LCP/authentication module 510 and LS module 540 before passing out of the network access server to a packet processor in a different network access server.

On the receiving side, a network access server receives a communication from a line server in another network access server and routes it through its local packet processor before forwarding it to the packet-switched network. This is illustrated by the data path which starts at the far right hand lower corner of FIG. 5, and passes through PP 530 and bridging/routing NCP 500, before connecting with a packet-switched network at the top of FIG. 5.

Figure 6:
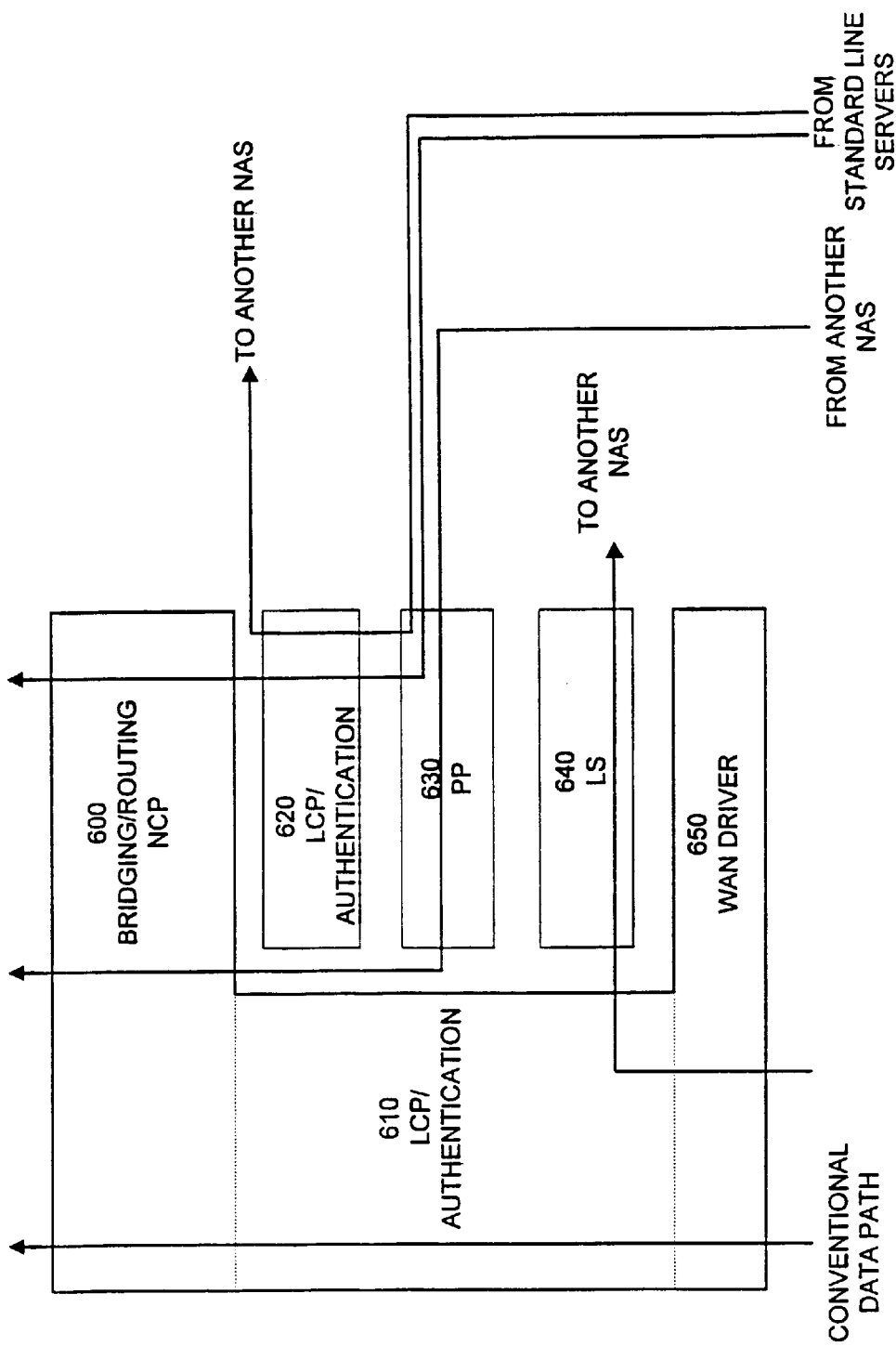
FIG. 6 is a diagram illustrating how data is routed through and between network access servers as appear in FIG. 2 in accordance with an aspect of the present invention.

FIG. 6 illustrates the possible data pathways through a standalone packet processor such as packet processors 200, 210 and 220 in FIG. 2. FIG. 6 illustrates a number of software modules. Bridging/routing NCP 600 performs interface functions for communications with a packet-switched network, such as network 240 within FIG. 2. LCP/authentication modules 610 and 620 perform link layer control protocol and authentication functions. PP module 630 performs packet processor functions. LS module 640 performs line server functions. WAN driver module 650 controls communications through telephone line ports to remote computing systems.

The conventional data path starting at the bottom left corner of FIG. 6 flows through WAN driver 650, then through LCP/authentication module 610 before passing into bridging/routing NCP module 600, and then ultimately to the packet-switched network. This is the case when a telephone line connects to the packet processor directly, necessitating a WAN driver. In one embodiment, packet processors include a plurality of WAN ports to accept such WAN inputs.

Another pathway originates in one of the WAN ports within the packet processor, passes through WAN driver 650, LCP/authentication module 610 and then through LS module 640, before continuing on to another network access server system using a tunneling protocol.

Correspondingly, a packet processor can accept an input from a line server in another network access server. This is illustrated by the pathway starting immediately to the right of the lower-right-hand corner of WAN driver 650 in FIG. 6. This pathway passes through PP module 630, which performs link layer control protocol functions, and then through bridging/routing NCP module 600, before passing on to the network.

There also exist pathways from line server modules, such as line servers 250, 252 and 254 in FIG. 2. These are illustrated by the two pathways originating in the lower-right-hand corner of FIG. 6. A first pathway passes through PP Module 630, then through LCP/authentication module 620 and bridging/routing NCP module 600 before connecting with the network. Alternatively, the connection from a line server may pass through PP module 630 and LCP/authentication module 620, before passing on to another packet processor to perform the bridging/routing NCP functions 600.

Figure 7:
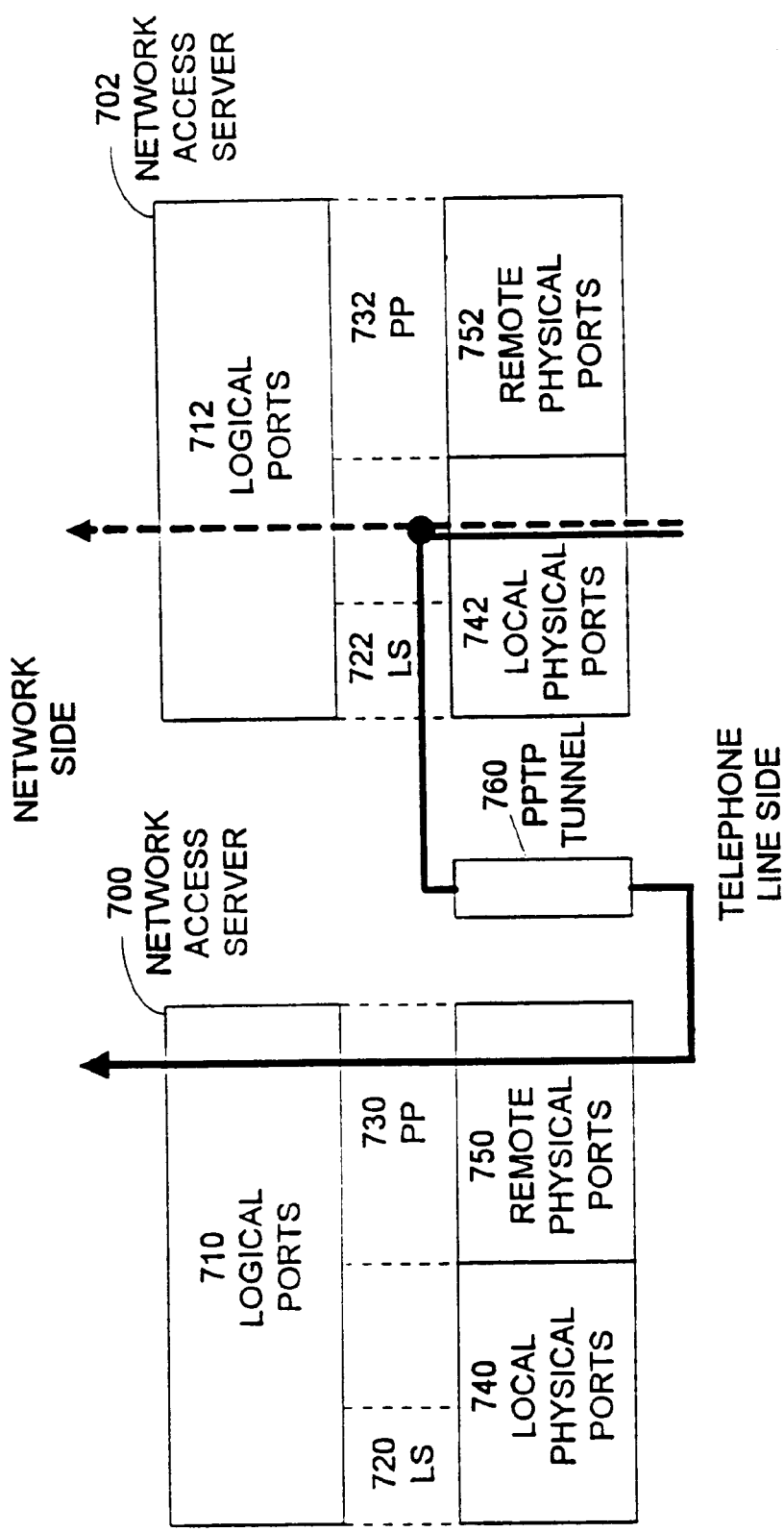
FIG. 7 is a block diagram illustrating how a communication is routed through a local physical port within one network access server and through a logical port in another network access server in accordance with an aspect of the present invention.

FIG. 7 illustrates the process of packet re-forwarding between network access server modules such as appear in FIG. 1. Network access server 700 includes a number of software components including a plurality of logical ports 710, a plurality of local physical ports (LPPs) 740 and a plurality of remote physical ports (RPPs) 750. Logical ports 710 contain data structures associated with logical connections to the computer network. Physical ports, including local physical ports 740 and remote physical ports 750, contain data structures associated with communications across telephone lines. Network access server 700 also includes LS module 720 to perform line server functions, and PP module 730 to perform packet processor functions.

Network access server 702 includes a plurality of logical ports 712, a plurality of local physical ports 742, and a plurality of remote physical ports 752. Network access server 702 additionally includes LS module 722 to perform line server functions, and PP module 732 to perform packet processor functions. Communications between network access server 700 and network access server 702 take place through PPTP tunnel 760.

A number of events occur during system initialization. For a single network access server operating in standalone mode, logical ports and physical ports are allocated during system initialization. When a client dials into the network access server across one of the telephone lines, a physical port is bound to a logical port.

For multiple network access servers operating together, multiple PPTP sessions are established between the multiple network access servers during system initialization. When a client dials in, its logical port might not be in the local network access server module. This can occur in several situations: (1) when a client dials in and requests free logical port and a free logical port does not exist; (2) when a spoofing client dials in and negotiates to reconnect or re-spoof, but the associated logical port is in the other network access server; and (3) when a multilink client with two channels dials into two separate network access servers, and the associated logical port for the client exists in only one of the network access servers. Under any of these circumstances, a local network access server re-forwards the data packets to the other network access server. The port mapping between local physical ports and remote physical ports is established through PPTP call handling procedures.

FIG. 7 illustrates both the conventional data path (dashed line) and the PPTP data path (solid line) through network access servers 700 and 702. When a client dials into network access server 702, as illustrated by the dashed and solid lines leading into local physical ports 742 the incoming local physical port is bound, if possible, to a logical port within network access server 702, and data packets will follow the conventional data path, which is illustrated by the dotted line. If a logical port is not available in network access server 702, the local physical port will be marked as a PPTP port and data packets flowing through the local physical port will pass through PPTP tunnel 760 to network access server 700. Within network access server 700, it will pass through one of the remote physical ports 750, and through PP 730, before ultimately passing into one of the logical ports 710 which connect to the network.

Figure 8:
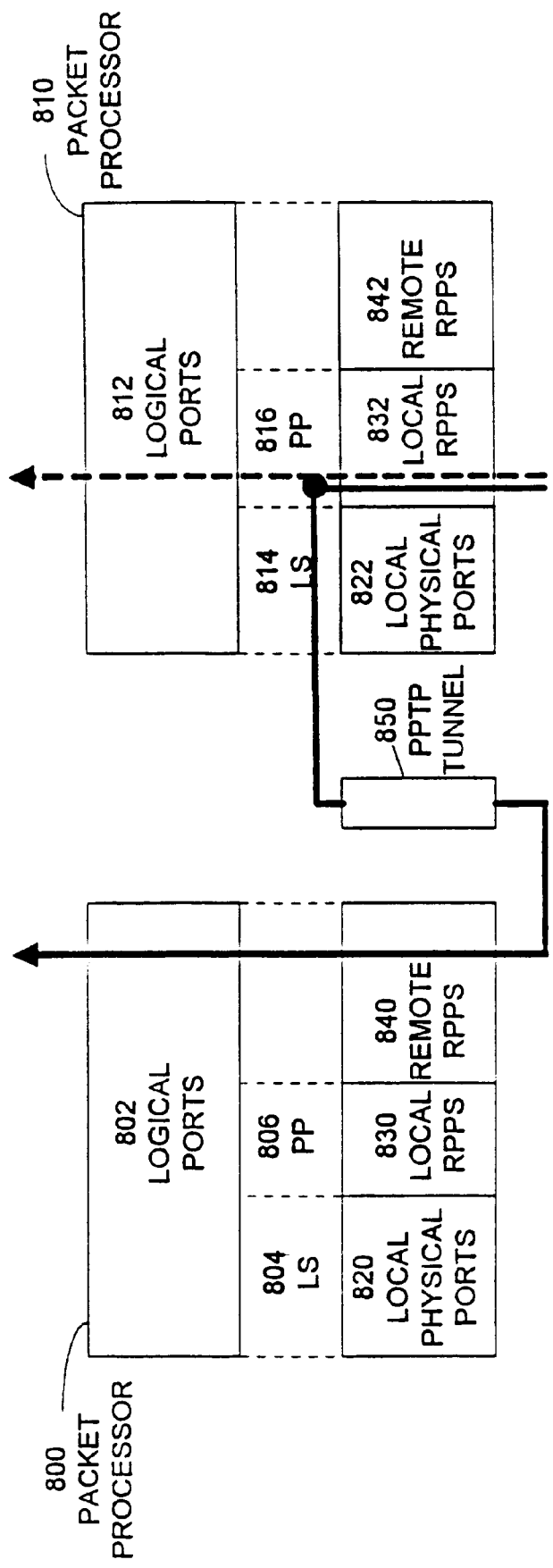
FIG. 8 illustrates how a communication is routed through a local remote physical port within one packet processor and through a remote remote physical port and a logical port in another packet processor in accordance with an aspect of the present invention.

FIG. 8 illustrates packet re-forwarding within a packet processor, such as packet processors 200, 210 and 220 in FIG. 2. In this embodiment, communications typically flow through standalone line servers before flowing into a packet processor. If no logical ports are available at the packet processor, the packet processor attempts to re-forward the communication through another packet processor. This happens in cases of: load sharing, multilink communications and spoofing. Packet processors consequently have two types of remote physical ports. A local RPP (LRPP) for accepting communications directly from a standalone line server, and a remote RPP (RRPP) for accepting forwarded communications from another packet processor.

Packet processor 800 includes logical ports 802, local physical ports 820, local RPPS 830, remote RPPS 840, LS module 804 and PP module 806. Packet processor 810 includes logical ports 812, local physical ports 822, local RPPS 832, remote RPPS 842, LS module 814 and PP module 816.

Packet re-forwarding between packet processors operates as follows. A client dials into a local RPP 832 in packet processor 810. This is illustrated by the solid and dashed lines entering local RPP 832 from the bottom of FIG. 8. Packet processor 810 authenticates the client, and then attempts to allocate a logical port to the client within logical ports 812. If a logical port is found, the local RPP will be bound to the logical port and data packets will traverse the standard PPTP data path, illustrated by the dashed line. If the port is not found or is not available, the local RPP will be marked as a PP port. Recall, that this can happen for a number of reasons: when a client dials in and requests a free logical port and the local packet processor does not have any free logical ports; when a spoofing client dials in and negotiates to reconnect or re-spoof, but the associated logical port is in another module; and when a multilink client with two channels dials into two separate packet processors and the associated logical port resides in only one packet processor.

If any of these circumstances arises, packet forwarding takes place. In the example illustrated in FIG. 8, a local RPP within path processor 810 makes a PPTP call to a remote RPP 840 within packet processor 800. All data packets from the line server to the local RPP are re-encapsulated with another header and sent along the solid line between local RPPS 832 within packet processor 810 and remote RPPS 840 within packet processor 800. This communication takes place through PPTP tunnel 850.

FIG. 9 is a table illustrating some of the major data structures associated with a physical port. Status data structure 910 contains status information associated with the physical port. This includes up/down status and call-back status. Statistics data structure 920 includes statistics about traffic through the physical port. This includes information on number of bytes, numbers of packets and error counts across the physical port. PPP table 930 keeps track of PPP connections across the physical port. Driver table 940 maintains information to support ISDN or asynchronous drivers for communications across the associated telephone line. Script data structure 950 includes references to modem control scripts. Security table 960 includes information used during the authentication process when a client dials into the associated physical port. PPTP table 970 includes information on PPTP connections associated with the physical port.

FIG. 10 is a table containing some of the major data structures associated with a logical port. Status data structure 1010 contains status information for the logical port. Statistics data structure 1020 includes statistics on the usage of the associated logical port, including statistics such as numbers of packets and error counts. PPP table 1030 maintains information to facilitate PPP connections through the logical port. Physical port data structure 1040 includes references to physical ports associated with the logical port. Bandwidth data structure 1050 includes information on the bandwidth utilization of the connection through the logical port. IP address data structure 1052 includes the IP address for the logical port on the network. IPX address data structure 1053 includes the IPX address of the logical port on the network. Spoofing data structure 1054 includes data structures to support spoofing through the associated logical port. Finally, multilink data structure 1055 includes data structures to facilitate multilink connections through the associated logical port.

In one embodiment, the present invention defines a set of messages, sent between network access servers or packet processors, including messages to verify whether a network access server has a free logical port or to check if a dialed local physical port is reserved for spoofing. In this embodiment, the following messages are used: a service request message to request that another network access server perform some type of service such as reporting a number of free logical ports, spoofing identification searches, multilink identification searches and searches for free/reserved physical ports; a service reply message to report the result of a service request; a pass LCP information message to transfer LCP information from line server to packet processor; a pass SLIP information message to transfer SLIP information from line server to packet processor, including the client's IP address and whether the client is running CSLIP; a pass user information message to pass user login related information from line server to packet processor; a port settled message from packet processor to line server to inform the line server that a remote physical port has been bound to a logical port and that frame re-forwarding can commence; an authentication query to check if authentication was successful on another network access server; and an authentication report message to report if authentication was successful at the local network access server.

Figure 11:
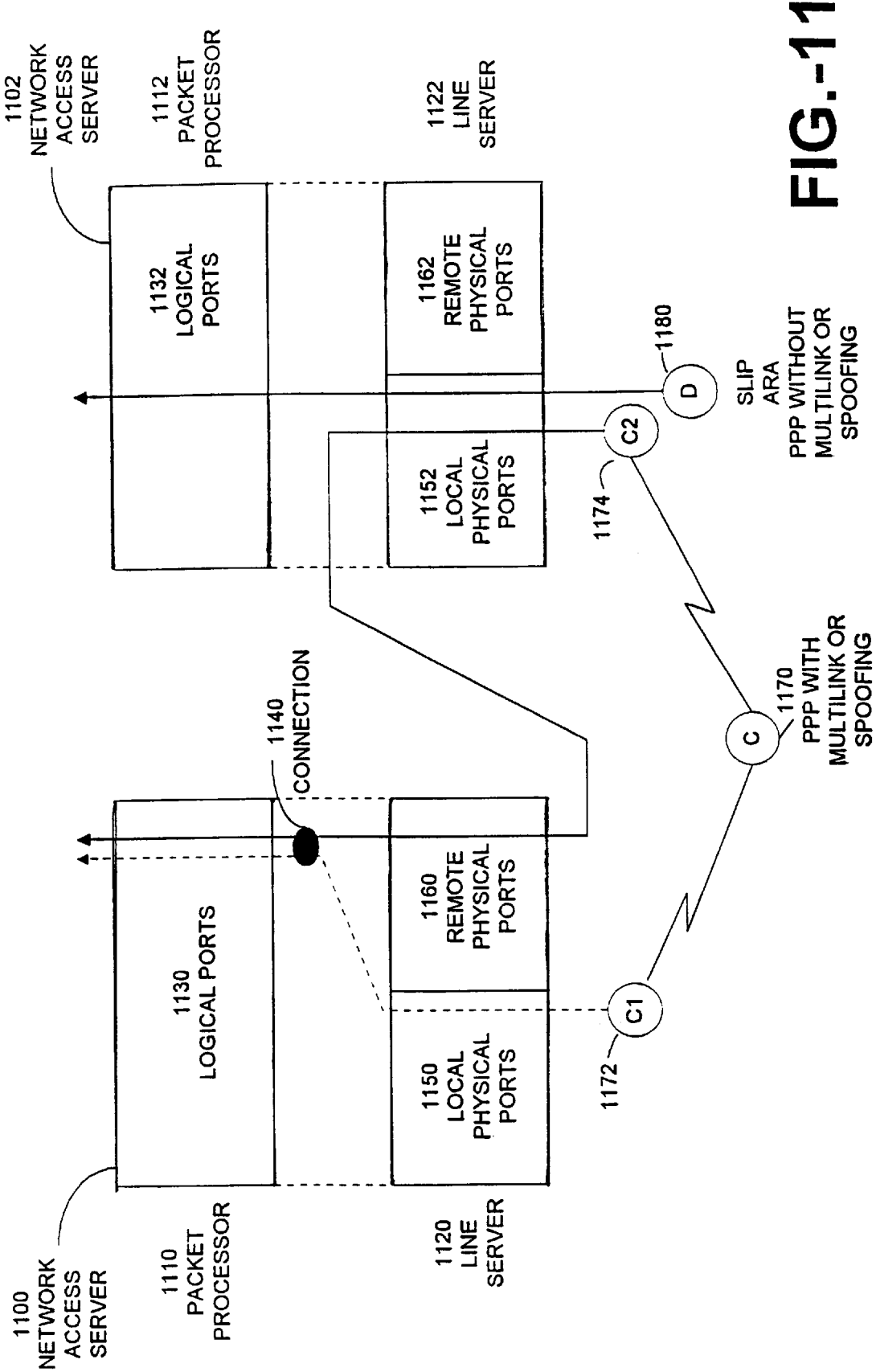
FIG. 11 illustrates a number of methods of routing communications through network access servers in accordance with an aspect of the present invention.

FIG. 11 illustrates a number of possible connections through a system of multiple network access servers. Network access server 1100 includes packet processor 1110 and line server 1120. Packet processor 1110 includes logical ports 1130. Line server 1120 includes local physical ports 1150 and remote physical ports 1160. Network access server 1102 includes packet processor 1112 and line server 1122. Packet processor 1112 includes logical ports 1132. Line server 1122 includes local physical ports 1152 and remote physical ports 1162.

Communications between line servers and packet processors operate as follows. If the logical port and associated physical ports are within the same network access server, no PPTP communications take place. The frames are simply forwarded through a conventional data path, as is illustrated by pathway D through network access server 1102. On the hand, when a line server within a network access server communicates with a packet processor in another network access server, this communication takes place through a PPTP session.

For example, in the multilink case, a multilink client C 1170 dials into network access server 1100 and network access server 1102 through channels C1 1172 and C2 1174, respectively. Assuming that C1 has been bound to logical port within network access server 1100 before C2 dials in, the frames sent through C2 are re-forwarded to network access server 1100. The frames from C1 and C2 are reassembled by the multilink module in network access server 1100 before routing through the network, as is illustrated by connection 1140.

Network access servers send messages to each other in order to determine whether another network access server has a free logical port, or if another network access server owns the logical port for an incoming call. Before sending these messages, the network access server first creates a node in a logical port search buffer (LPSB), so that search requests for the client can be tracked. The search reply information from other network access servers are stored in this LPSB so that a local network access server can determine which network access server it should forward the packets to. The LPSB is used to support multilink identification searches, spoofing identification searches and searches for free logical ports and free/reserved physical ports.

In the case of spoofing, a network access server reserves a physical port for each spoofed client so that clients can subsequently dial back in. When a client dials in, the network access server queries physical port reservation status in local data structures as well as data structures in other network access servers and decides if the client may be spoofed. The network access server tries its best to avoid frame re-forwarding.

Figure 12:
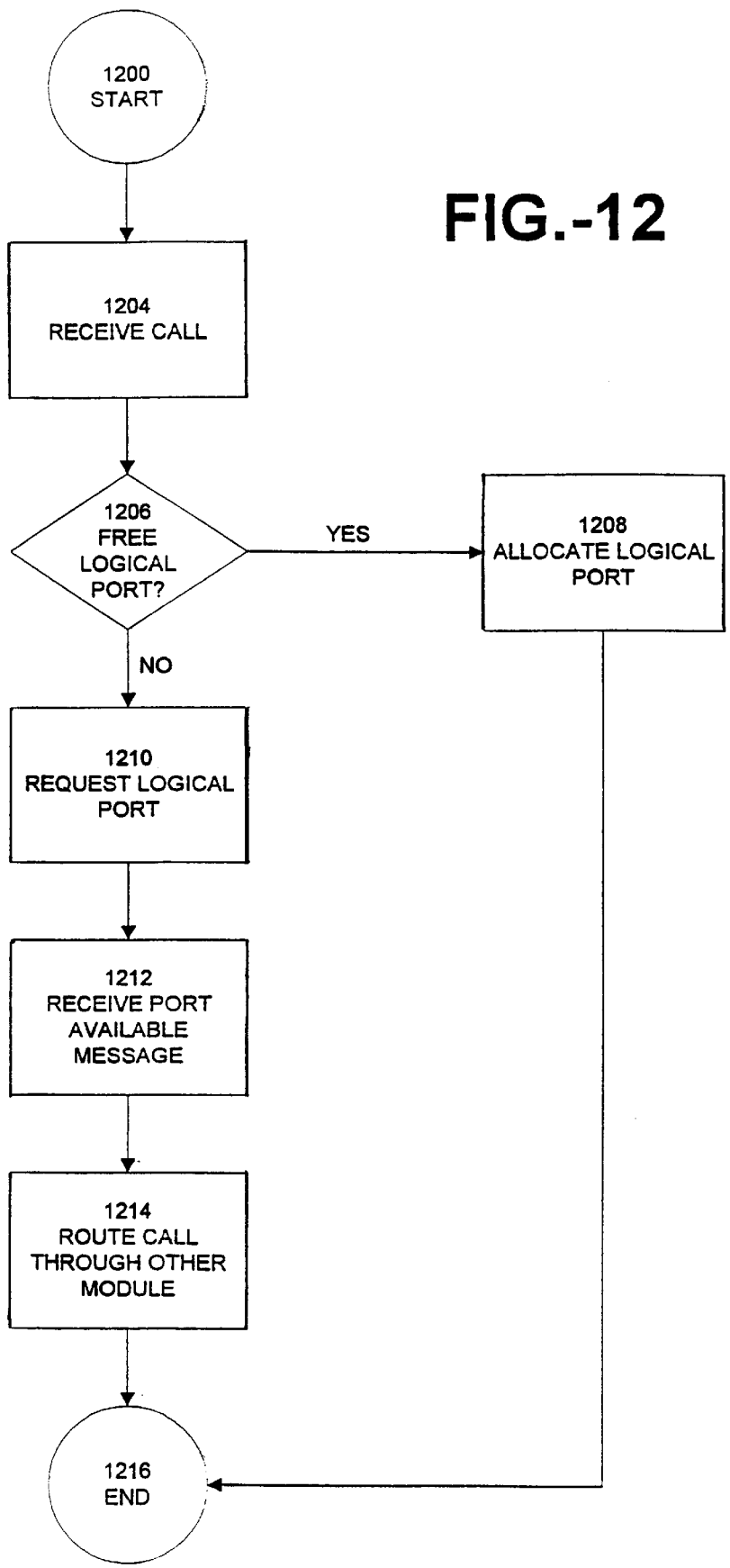
FIG. 12 is a flow chart illustrating how load sharing operates between multiple network access servers in accordance with an aspect of the present invention.

FIG. 12 illustrates a flowchart of the process for load sharing between network access servers in accordance with an aspect of the present invention. A network access server starts at state 1200, which is a start state. The server then proceeds to state 1204. At step 1204, the server receives a call from a telephone line on one of its ports. The system then proceeds to step 1206. At step 1206, the system asks whether there is a free logical port within the network access server. If so, the system proceeds to step 1208. If not, the system proceeds to step 1210. At step 1208, the system has found a logical port within the network access server; it allocates the logical port and proceeds to step 1216 which is an end state. At step 1210, no free logical port exists in the local network access server, and the server requests a logical port from other network access servers. The system then proceeds to step 1212. At step 1212, the system receives a "port available" message from another network access server. The system then proceeds to step 1214. Not shown in the flowchart is the case where a "no port available" message is received by the network access server. In this case, after a certain timeout period, the call will fail because no logical port can be allocated to it. At step 1214, the call is routed through the other network access server so that the call uses a physical port in the local network access server and a logical port in the remote network access server. The system then proceeds to step 1216 which is an end state.

Figure 13:
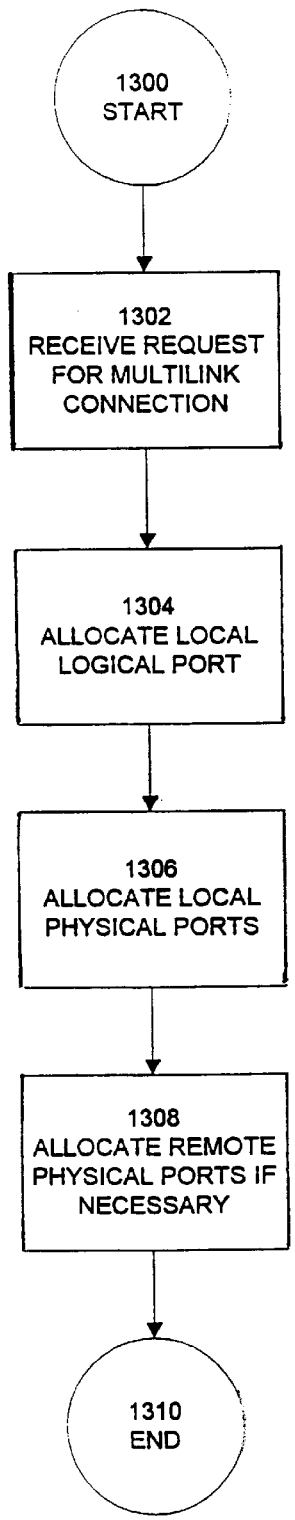
FIG. 13 is a flow chart illustrating how multilink connections are established through multiple network access servers in accordance with an aspect of the present invention.

FIG. 13 illustrates the process of establishing a multilink connection. At either a network access server system or a packet processor system. The system starts at state 1300 which is a start state. It then proceeds state 1302. At state 1302, the system receives a request for a multilink connection. The system proceeds to step 1304. At step 1304, the system allocates a local logical port on the local system. The system then proceeds to step to 1306. Not shown in this flowchart is the case where no logical ports are available, in this case the system attempts to allocate a logical port on a different system, or the multilink connection may fail. At step 1306, the system allocates as many local physical ports as possible to accommodate the multilink connection. The system then proceeds to step 1308. At step 1308, the system allocates additional remote physical ports, as necessary, to accommodate all of the links in the multilink connection. This is accomplished by a series of communications with other network access servers or packet processors. The system then proceeds to step 1310 which is an end state.

Figure 14:
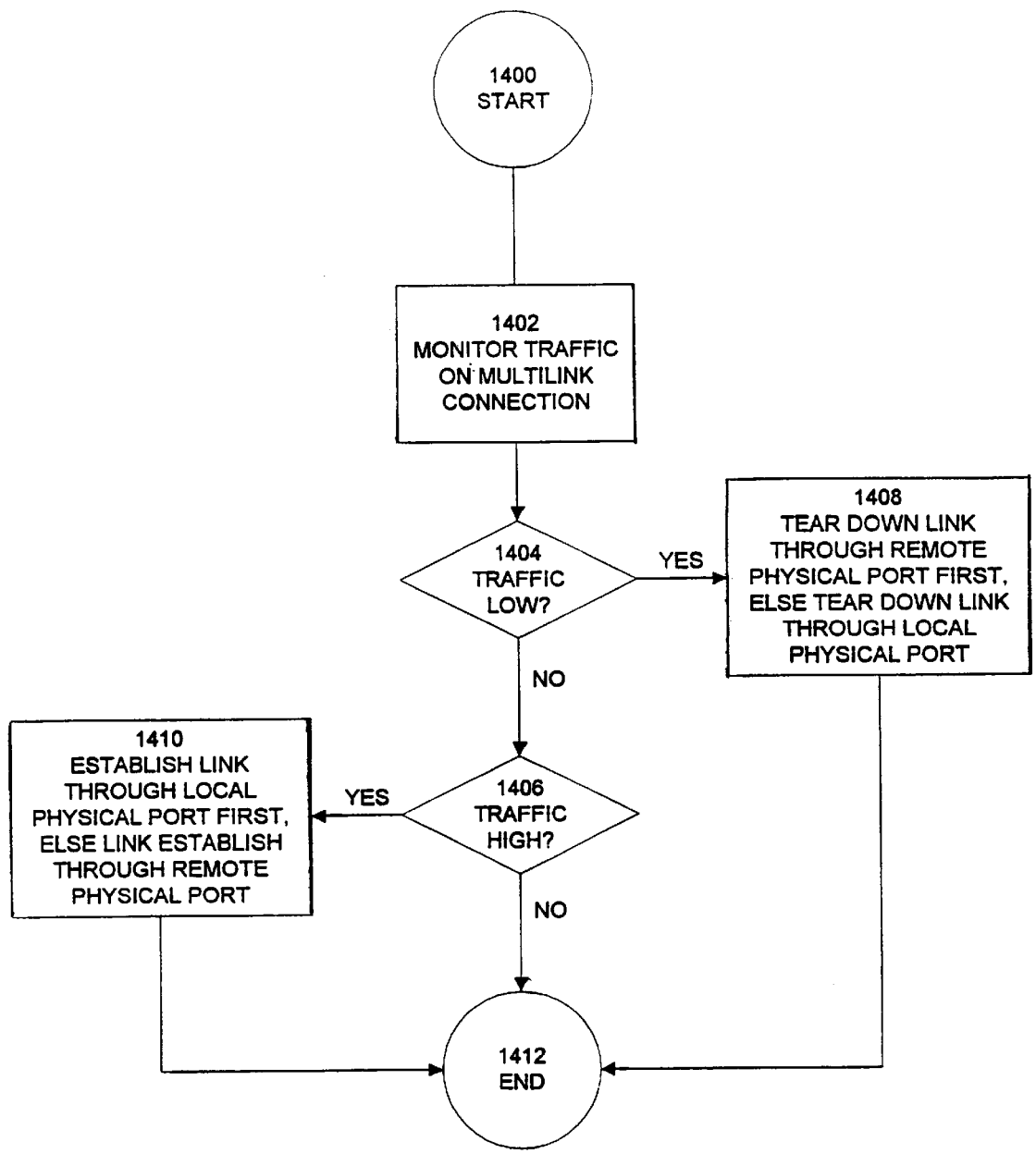
FIG. 14 is a flow chart illustrating how bandwidth-on-demand operates across multiple network access servers in accordance with an aspect of the present invention.

FIG. 14 is a flowchart illustrating the operations of a network access server system or a packet processor system in implementing bandwidth-on-demand functions. The system starts at state 1400 which is a start state. The system proceeds to state 1402, in which it monitors traffic on an existing multilink connection. The system then proceeds to step 1404. At step 1404, the system asks whether the traffic is low on the multilink connection. If so, the system proceeds to step 1408. If not, the system proceeds to step 1406. At step 1408, the system has determined that the traffic on the multilink connection is low, and it tears down a link. In doing so, it first attempts to tear down a link through a remote physical port in order to eliminate unnecessary re-forwarding traffic. If it cannot tear down a link through a remote physical port, it seeks to tear down a link through a local physical port. The system then proceeds to step 1412 which is an end state. At step 1406, the system asks if the traffic through the multilink connection is high. If so, the system proceeds to step 1410. If not, the system proceeds to step 1412 which is an end state. At step 1410, the system attempts to establish an additional link through a local physical port in order to prevent unnecessary communications across the network. If this is not possible, the system attempts to establish a link through a remote physical port. The system then proceeds to step 1412 which is an end state.

Figure 15:
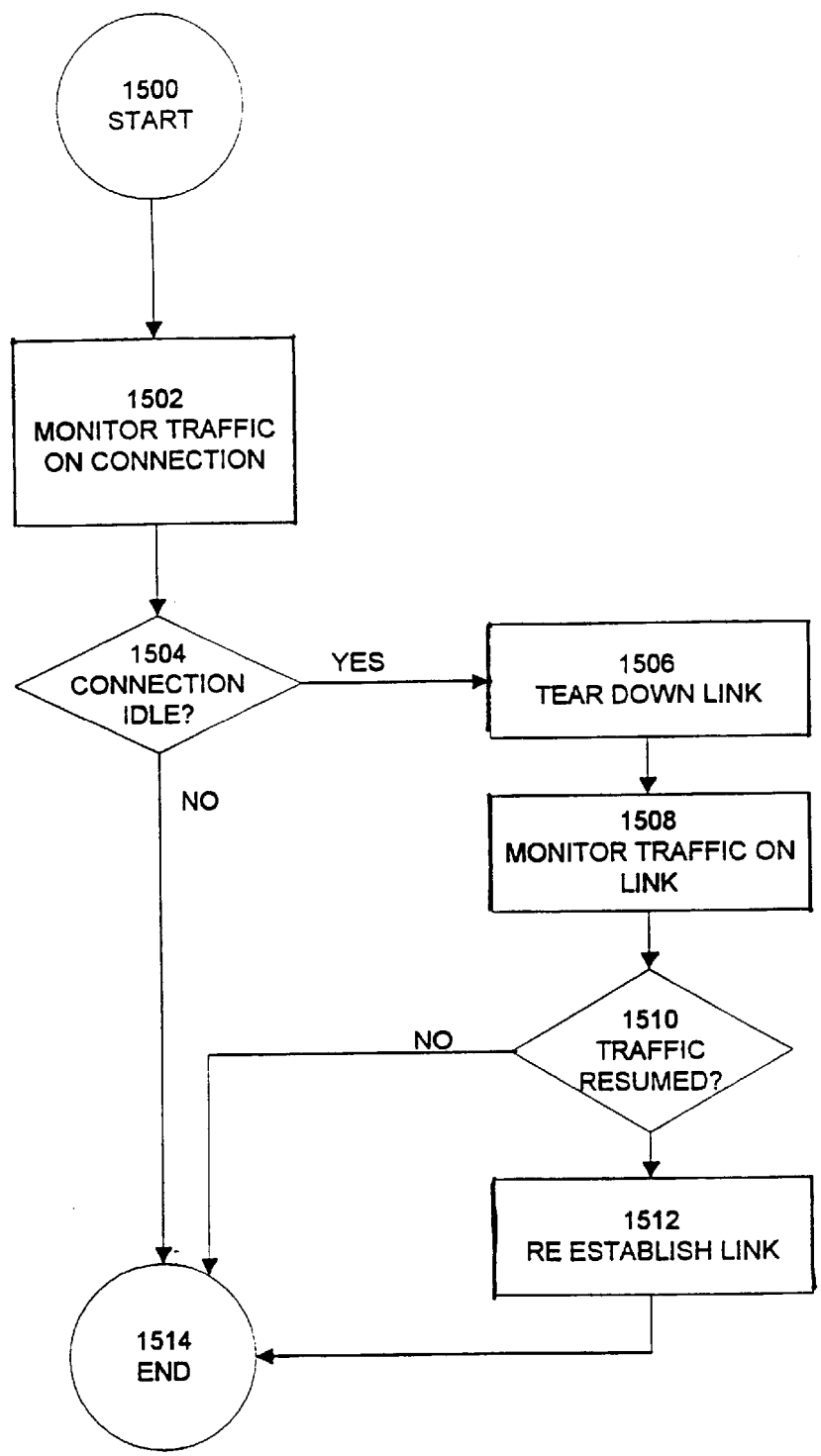
FIG. 15 is a flow chart illustrating how spoofing operates across multiple network access servers in accordance with an aspect of the present invention.

FIG. 15 illustrates the sequence of operations involved in spoofing at a network access server system or packet processor system in accordance with an aspect of the present invention. The system starts at step 1500 which is a start state. It then proceeds to step 1502, wherein the system monitors traffic on a pre-existing connection. It then proceeds to step 1504. At step 1504, the system asks whether the connection has been "idle" for a significant period of time. "Idle" means either there is no traffic at all, or there has only been link maintenance traffic, such as keep alive packets, on the connection. If the link has been idle, the system proceeds to step 1506. If not, the system proceeds to step to 1514 which is an end state. At step 1506, the system has determined that the connection as been idle for a significant period of time and the system tears down the link. The system then proceeds to step 1508. At step 1508, the system monitors traffic through the link. The system then proceeds to step 1510. At step 1510, the system asks whether traffic through the link has been resumed. If not, the system proceeds to step 1514 which is an end state. If so, the system proceeds to step 1512. At step 1512, the system re-establishes the link for the multilink connection. The system then proceeds to step 1514 which is an end state.

Figure 16:
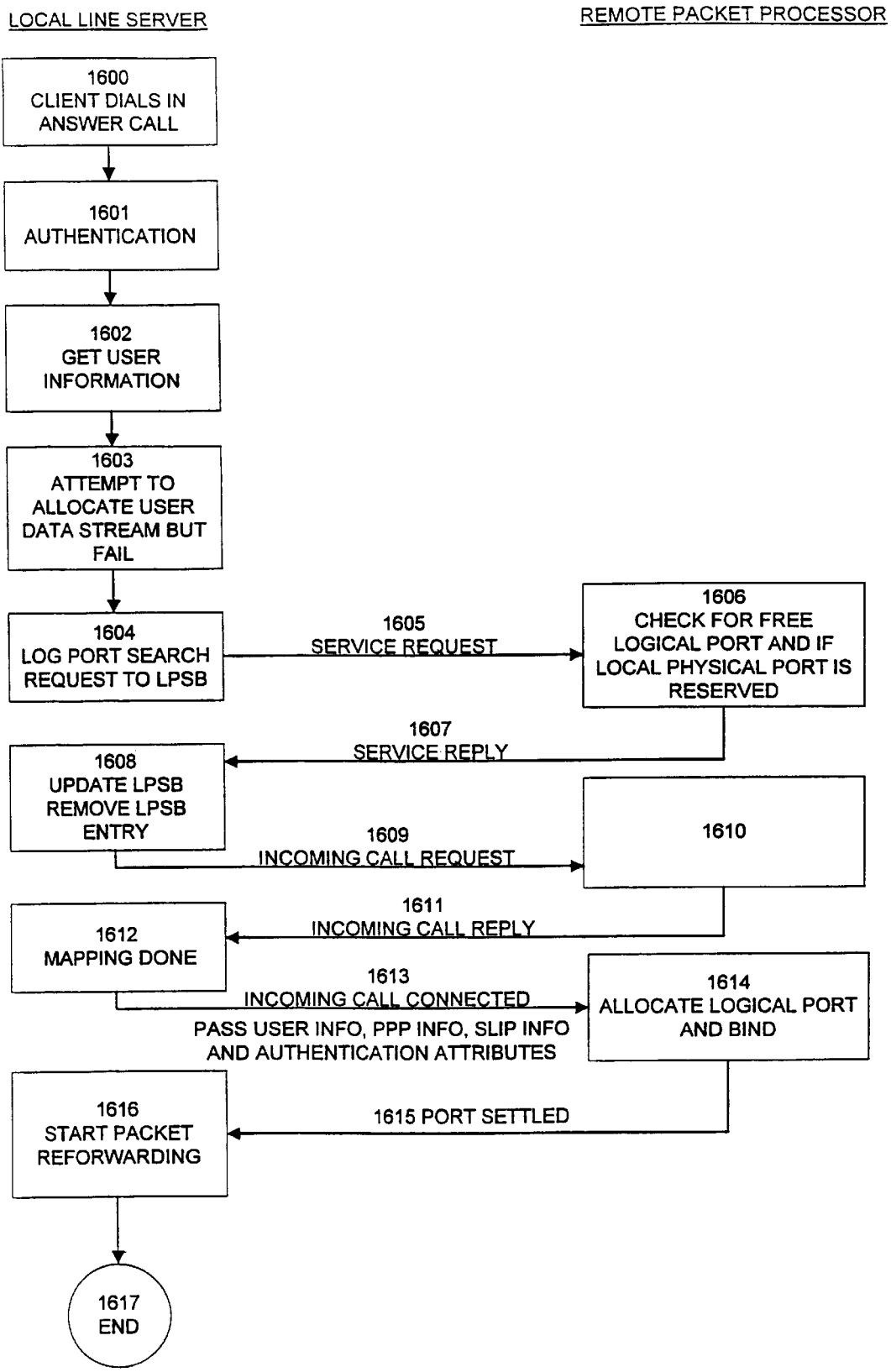
FIG. 16 is a detailed flow chart illustrating the sequence of operations involved in routing communications through multiple network access servers in accordance with an aspect of the present invention.

FIG. 16 is a detailed flowchart illustrating the operations involved in performing load sharing across multiple network access servers or packet processors in accordance with an aspect of the present invention. The sequence of operations for load sharing is almost identical to the sequence of operations for packet re-forwarding to support multilink connections or to support spoofing across multiple network access servers or packet processors. FIG. 16 illustrates operations for a local line server within a local network access server in the left-hand column, and operations for a remote packet processor in a remote network access server in the right-hand column.

The system begins at state 1600, in which a client dials in and the system answers the call. The system next proceeds to step 1601. At step 1601, the local line server performs authentication functions on the client before allowing it to connect to the local line server. The system then proceeds to step 1602. At step 1602, the system gets information from the user. The system next proceeds to step 1603. At step 1603, the system attempts to allocate a user data stream but fails. The system next proceeds to step 1604. Not shown on this flowchart is the case where the user successfully allocates a physical port in the local packet processor. In this case, the physical port is allocated to the data stream and the system proceeds to transmit data through the physical port. At step 1604, the local line server has failed to allocate a physical port in the local packet processor and it logs a port search request in the logical port search buffer (LPSB). It then sends a service request 1605 to the remote packet processor. At step 1606, the remote packet processor receives the service request, checks whether free logical port and a local physical port are available. If a logical port and a local physical port are available, the remote packet processor sends a service reply 1607 to the local line server. At state 1608, the local line server updates the LPSB and removes the LPSB entry corresponding to the connection. The local line server then transmits an incoming call request 1609 to the remote packet processor. At step 1610, the remote packet processor transmits an incoming call reply 1611 back to the local line server. At step 1612, the local line server has completed the mapping. The local line server then transmits a message to the remote packet processor indicating that the incoming call is connected, and then passes information 1613 to the remote packet processor. This information 1613 includes: information from the user, PPP information, SLIP information and authentication attributes. At step 1614, the remote packet processor allocates a logical port and binds the logical port. The remote packet processor then transmits a port settled message 1615 to the local line server. At step 1616, the local line server receives the port settled message and starts the process of packet re-forwarding. The system then proceeds to step 1617 which is an end state.

Figure 17:
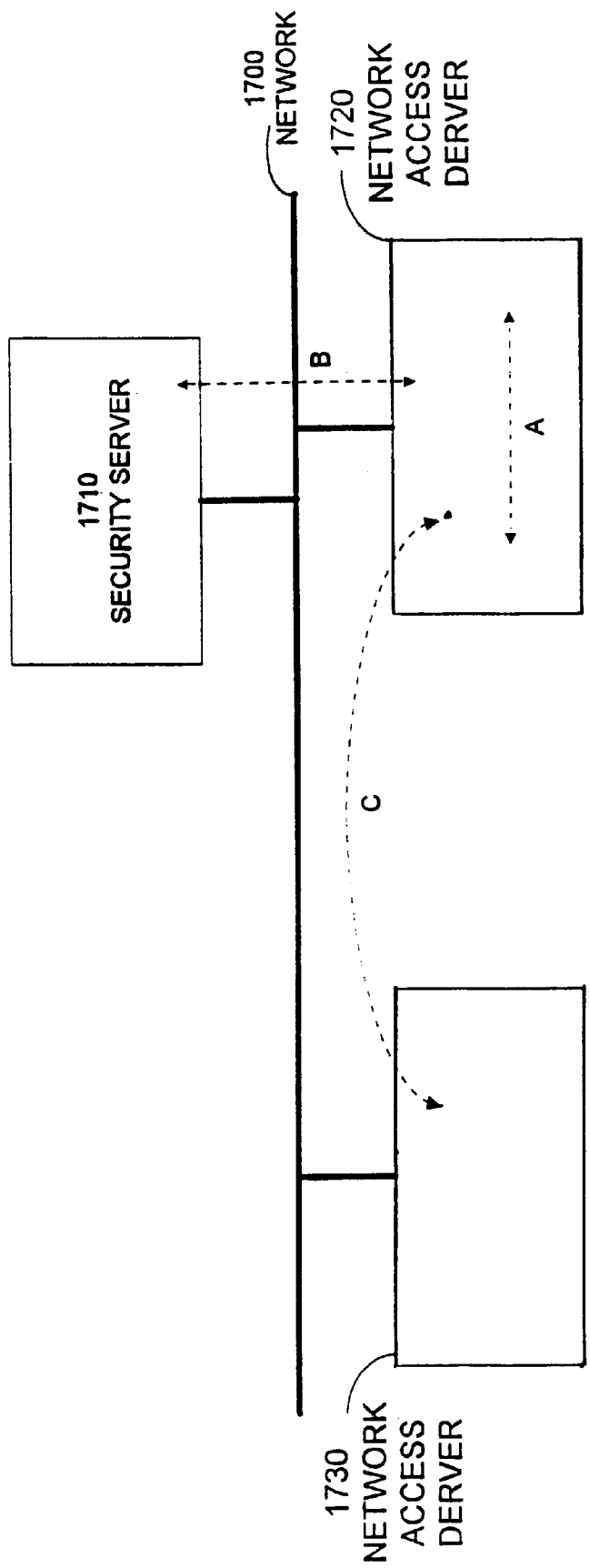
FIG. 17 illustrates how authentication operates across multiple network access servers and a security server in accordance with an aspect of the present invention.

FIG. 17 illustrates the sequence of operations involved in performing authentication in a system including two network access servers 1720 and 1730, and a security server 1710. The system includes network 1700 which is coupled to network access server 1730, network access server 1720, and security server 1710. Upon receiving a connection request from a user at network access server 1720, network access server 1720 first searches for the user's name in security tables in local physical ports at network access server 1720. This is illustrated by the dashed line labeled A. Next, if the user is not found within the local physical ports within network access server 1720, the system attempts to authenticate the user through security server 1710 across network 1700. This is indicated by the dashed line labeled B. Finally, if the authentication through security server 1710 fails, network access server 1720 exchanges messages across network 1700 with other network access servers to verify whether or not the same user has dialed into one of the other network access servers through another channel and has already been authenticated by security server 1710. This is indicated by the dashed line labeled B.

In one embodiment, there are four possible security states associated with a local physical port which are stored in a table at the local physical port: an idle state, which is the initial value in the table; a waiting state, indicating that an authentication request has been sent to the security server and the network access server is waiting for a reply; a success state, indicating that authentication has been accepted by the security server; and fail state, indicating that authentication has been rejected by the security server.

The security table is updated in the following way. During an internal search of the security table in the local physical port, if the user is not found the state is set to "waiting," an authentication request is sent to the security server. If the user is found and the state is "idle," the password authentication protocol (PAP) request is discarded. If the user is found and the state is "waiting," the request is silently discarded. If the user is found and the state is "success," the PAP request is acknowledged. If the user is found and the state is "failed," the system sends an authentication query to another network access server. When an authentication reply is received from the security server and the reply indicates that the authentication request is accepted, the security table of the associated local physical port is set to a "success" value. When an authentication reply is received from the security server and the reply indicates that the authentication request is rejected, the security table of the associated local physical port is set to a "fail" value.

When an authentication report is received from another network access server and the result is "not found," the PAP fails. When the result is "idle" the system silently discards the PAP request. When the results is "waiting," the system silently discards the PAP request. When the result is "success," the state of the associated security table is set to success. When the result is "fail," authentication cannot take place, and the PAP request fails.

Figure 18:
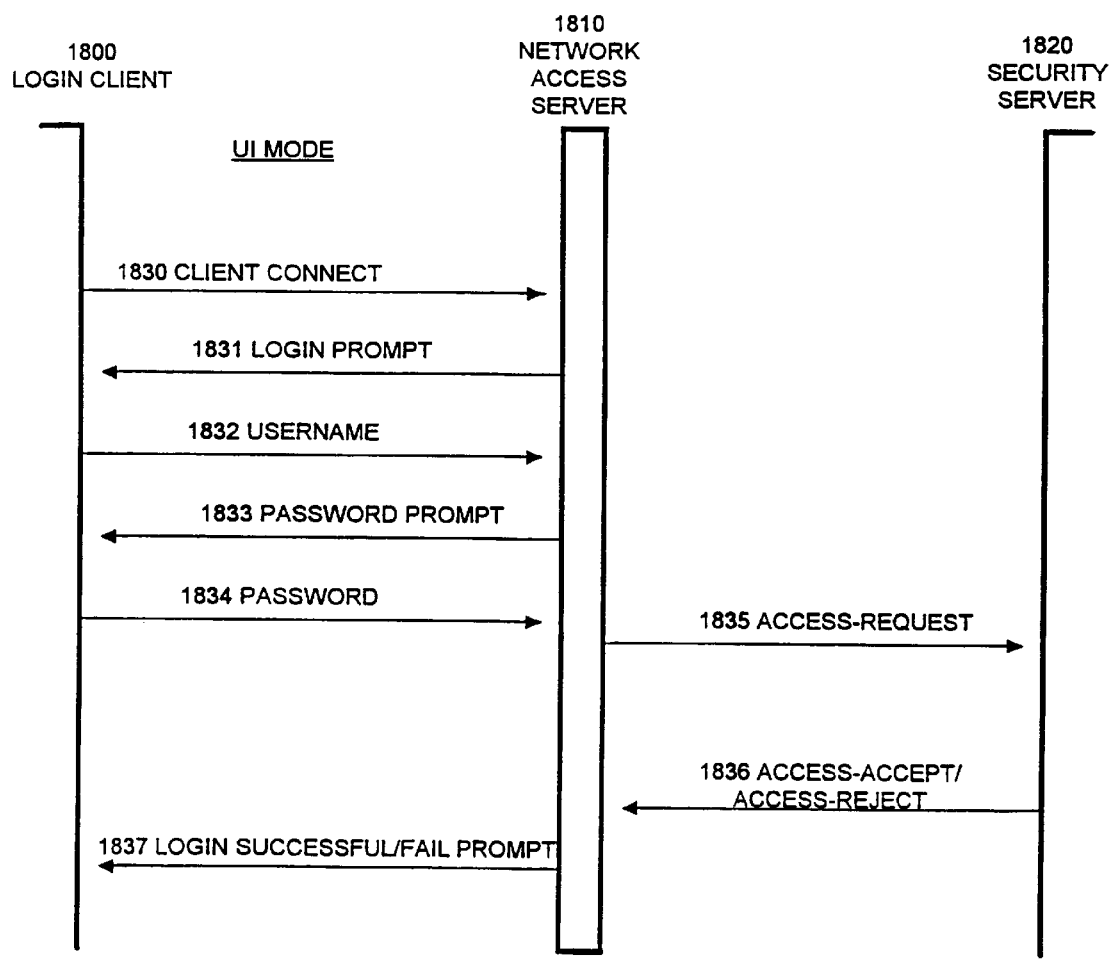
FIG. 18 illustrates how authentication operates in user interface mode without a challenge using a security server in accordance with an aspect of the present invention.

FIG. 18 illustrates the operation of the network access server in forwarding requests from the user interface and the security server without any challenges from the security server in accordance with an aspect of the present invention. Login client 1800 first connects 1830 to network access server 1810. Network access server 1810 then sends a login prompt 1831 to login client 1800. Login client 1800 then sends a user name to 1832 to network access server 1810. Network access server 1810 then sends a password prompt 1833 to login client 1800. Login client 1800 then enters a password 1834 and sends it to network access server 1810. Network access server bundles the user name and password together into an access request 1835 and sends this access request 1835 to security server 1820. Security server 1820 processes this user name and password pair and sends either an access accept or access reject 1836 message back to network access server 1810. Network access server 1810 then sends a login successful or login fail prompt 1837 to login client 1800. If network access server 1810 received an access reject message, the user interface goes through a retry process which is not shown.

Figure 19:
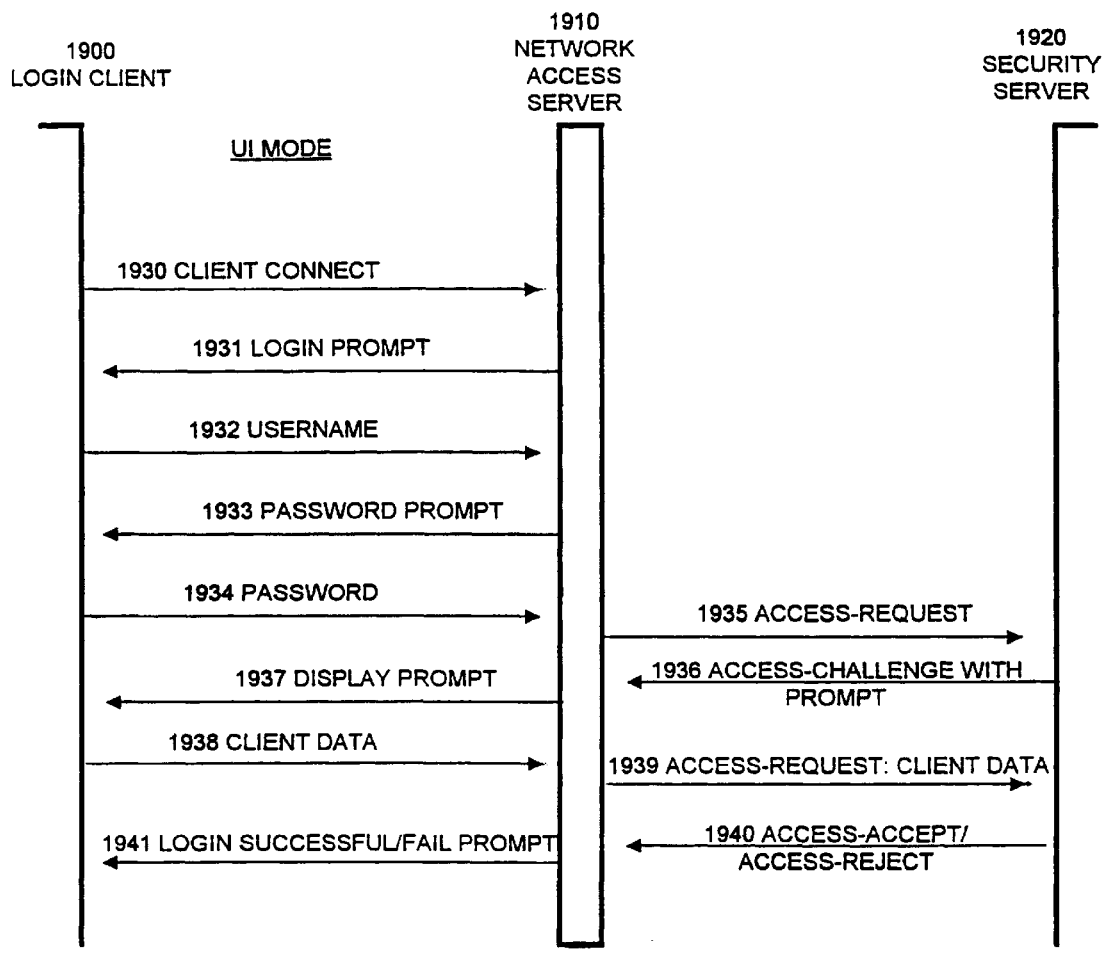
FIG. 19 illustrates how authentication operates in user interface mode with a challenge using a security server in accordance with an aspect of the present invention.

FIG. 19 illustrates communications between login client 1900, network access server 1910 and security server 1920 during an authentication in user interface mode including an access challenge in accordance with an aspect of the present invention. First, login client 1900 connects 1930 to network access server 1910. Next, login client 1900 and network access server 1910 engage in a sequence of login and password communications 1931, 1932, 1933 and 1934. After these are complete, network access server 1910 bundles a user name and password into an access request 1935, and transmits this access request 1935 to security server 1920. Security server 1920 then transmits an access challenge 1936 with a prompt to network access server 1910. Network access server 1910 then transmits the prompt 1937 to login in client 1900. Login client 1900 then enters the requested data 1938 and transmits it to network access server 1910. Network access server 1910 then transmits the client data 1939 in an access request to security server 1920. Security server 1920 then transmits an access accept or access reject message 1940 to network access server 1910. Network access server 1910 then transmits a login successful or a fail message 1941 to login client 1900. Network access server 1910 processes additional rounds of challenge and response as necessary for the authentication process.

Figure 20:
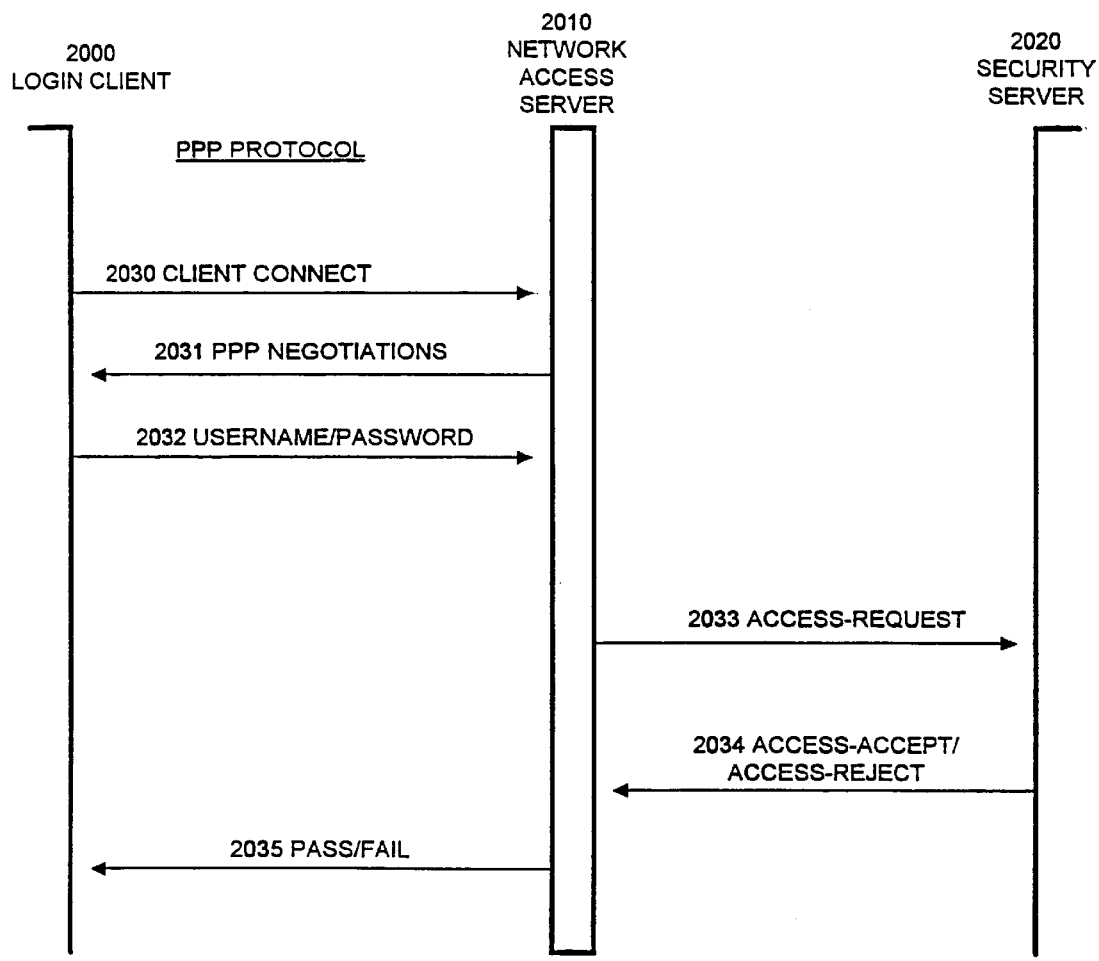
FIG. 20 illustrates how authentication operates in PPP protocol mode and IPX dialout mode using a security server in accordance with an aspect of the present invention.

FIG. 20 illustrates the sequence of operations involved in performing authentication between login client 2000, network access server 2010 and security server 2020, wherein login client 2000 communicates with network access server 2010 using a PPP protocol in accordance with an aspect of the present invention. First, login client 2000 connects 2030 to network access server 2010. Next, PPP negotiations 2031 take place between login client 2000 and network access server 2010. Next, login client 2000 sends a user name and password to network access server 2010. Network access server 2010 bundles the user name and password together and sends them in an access request 2033 to security server 2020. Security server 2020 then sends either an access accept or access reject message 2034 to network access server 2010. Network access server 2010 then sends a pass or fail message 2035 to login client 2000. This sequence of operations is very similar to the sequence of operations in user interface mode. However, if security server 2020 sends a challenge, network access server 2010 has to fail the authentication, since PPP does not allow the login client to send additional information.

Figure 21:
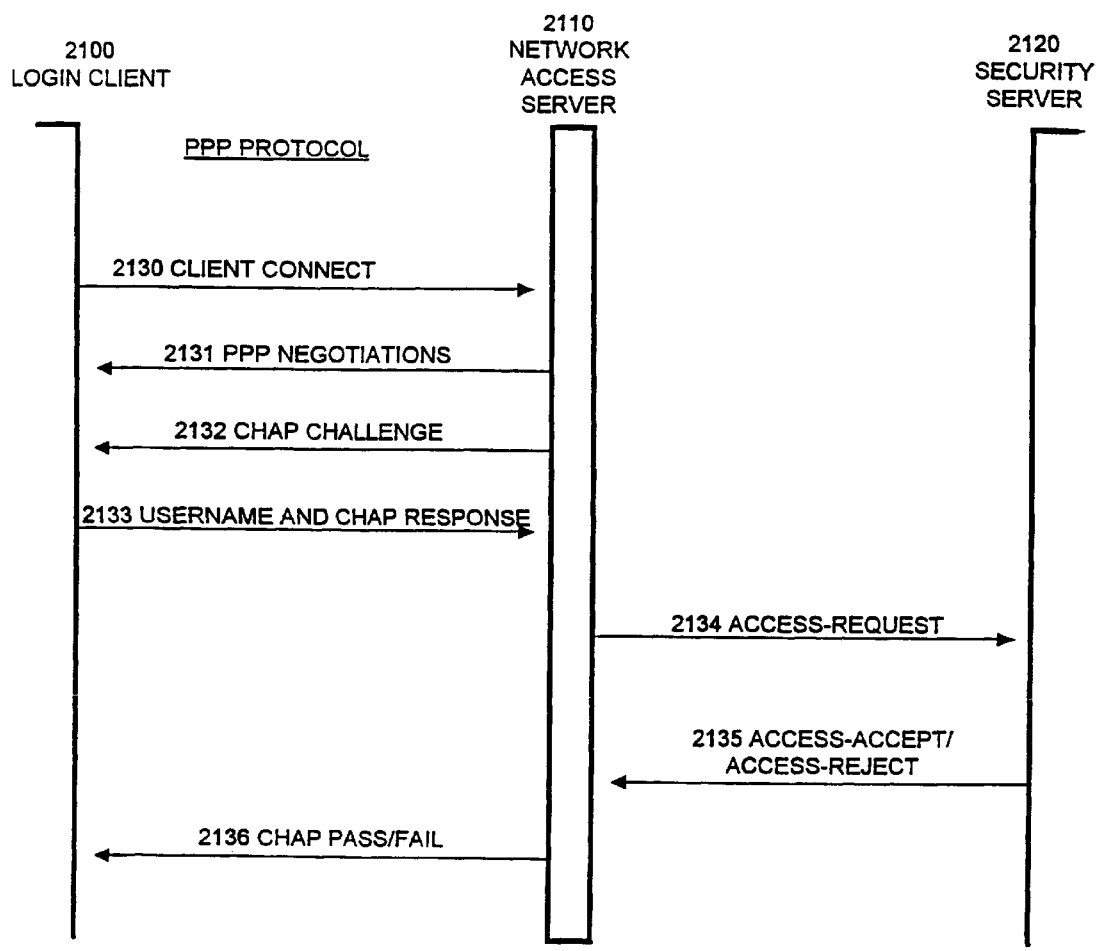
FIG. 21 illustrates how authentication operates in PPP/CHAP mode using a security server in accordance with an aspect of the present invention.

FIG. 21 illustrates a series of communications between login client 2100, network access server 2110 and security server 2120, wherein login client 2100 communicates with network access server 2110 through a PPP protocol using the challenge handshaking authentication protocol (CHAP) mode in accordance with an aspect of the present invention. Login client 2100 first connects 2130 to network access server 2110. Next, PPP negotiations 2131 take place between login client 2100 and network access server 2110. Next, network access server 2110 next sends a CHAP challenge 2132 to login client 2100. Login client 2100 then sends a user name and a CHAP response 2133 to network access server 2110. Network access server 2110 bundles the CHAP challenge, user name and CHAP response into an access request 2134 and sends this access request 2134 to security server 2120. Security server 2120 then computes the CHAP response with the CHAP challenge and the user password. If the result matches the CHAP response received, security server 2120 sends an access accept message 2135 to network access server 2110. Otherwise, it sends an access reject message 2135 to network access server 2110. Network access server 2110 then sends a CHAP pass 2136 or a CHAP fail 2136 to login client 2100.

CONCLUSION

The present invention provides an architecture which allows a plurality of network access servers or a plurality of packet processors to be connected together to form a single system for connecting a plurality of telephone lines to a packet-switched network. The invention provides scalability by allowing additional network access servers or packet processors to be connected to an existing system to expand capacity. The present invention also facilitates: load sharing between network access servers or packet processors; multilink connections across multiple network access servers or packet processors; and bandwidth on demand or spoofing across multiple network access servers or packet processors. Finally, the present invention facilitates authentication across multiple network access servers through a security server.

The foregoing description of embodiments of the present invention has been presented for purposes of illustration and description only. It is not intended to be exhaustive or to limit the invention to be forms disclosed. Obviously, many modifications and variations will be apparent to practitioners skilled in the art.

What is claimed is:

1. In a system for coupling a plurality of telephone lines to a packet-switched network, including a plurality of modules coupled to the packet-switched network, modules in the plurality of modules including resources for facilitating communications between telephone lines in the plurality of telephone lines and the packet-switched network, each module in the plurality of modules including a plurality of physical ports and a plurality of logical ports, a method for distributing communications between telephone lines in the plurality of telephone lines and the packet-switched network across modules in the plurality of modules, comprising:

receiving at a physical port in the plurality of physical ports at a module in the plurality of modules a call from a telephone line in the plurality of telephone lines;

determining if resources are available for the call among the plurality of logical ports at the module; and if no resources are available, forwarding the call to a logical port in the plurality of logical ports of another module in the plurality of modules.

2. The method of claim 1, wherein the forwarding the call includes:

requesting resources from other modules in the plurality of modules;

in response to a communication indicating that resources are available at another module in the plurality of modules, forwarding the call to a logical port in the plurality of logical ports at the other module.

3. The method of claim 2, wherein the step of requesting resources from other modules in the plurality of modules includes broadcasting a request for additional resources to other modules in the plurality of modules.

4. The method of claim 1, wherein the step of forwarding the call involves attempting to forward the call through a pre-determined module in the plurality of modules, and if the pre-determined module has resources available for the call, forwarding the call to a logical port in the plurality of logical ports at the pre-determined module.

5. The method of claim 1, wherein the step of forwarding the call involves communicating with the other module using a tunneling protocol.

6. The method of claim 5, wherein the tunneling protocol includes the PPTP protocol.

7. The method of claim 1, wherein the packet-switched network includes the Internet.

8. In a system for coupling a plurality of telephone lines to a packet-switched network, including a plurality of modules connected to a communication channel, modules in the plurality of modules including, a plurality of physical ports for facilitating communications with a plurality of telephone lines, and a plurality of logical ports for facilitating connections to the packet-switched network, a method for distributing communications between telephone lines in the plurality of telephone lines and the packet-switched network across modules in the plurality of modules, comprising:

receiving at a physical port in the plurality of physical ports at a module in the plurality of modules a call from a telephone line in the plurality of telephone lines;

determining that no logical ports are available for the call at the module; and forwarding the call through a logical port in another module in the plurality of modules.

9. The method of claim 8, wherein the step of forwarding the call includes:

requesting an available logical port from other modules in the plurality of modules; and in response to a communication indicating that a logical port is available in another module in the plurality of modules, routing the call through the logical port in the other module.

10. The method of claim 9, wherein the step of requesting an available logical port includes broadcasting a request for the available logical port to modules in the plurality of modules.

11. The method of claim 8, wherein the step of forwarding the call through a logical port in another module, involves attempting to forward the call through a logical port in a pre-determined module in the plurality of modules, and if the pre-determined module has an available logical port for the call, forwarding the call through the available logical port of the pre-determined module.

12. The method of claim 8, wherein the step of forwarding the call through another module involves communicating between the physical port in the module and the logical port in the other module using a tunneling protocol.

13. The method of claim 12, wherein the tunneling protocol includes the PPTP protocol.

14. The method of claim 8, wherein the packet-switched network includes the Internet.

* * * * *